US010683170B2

(12) United States Patent
Buzan et al.

(10) Patent No.: US 10,683,170 B2
(45) Date of Patent: Jun. 16, 2020

(54) AUTOMATED STORAGE AND RETRIEVAL SYSTEM

(71) Applicant: Symbotic, LLC, Wilmington, MA (US)

(72) Inventors: Forrest Buzan, Dunstable, MA (US); Michael Cyrulik, Sudbury, MA (US); Aria Reynolds, Cambridge, MA (US); Jason S. Sirois, Atkinson, NH (US); Larry Sweet, Atlanta, GA (US); Edward A. MacDonald, Somerville, MA (US); Taylor A. Apgar, Boston, MA (US); Timothy Perrault, Ipswich, MA (US); Stephen C. Toebes, Chelmsford, MA (US)

(73) Assignee: SYMBOTIC, LLC, Wilmington, MA (US)

(*) Notice: Subject to any disclaimer, the term of this patent is extended or adjusted under 35 U.S.C. 154(b) by 0 days.

(21) Appl. No.: 16/667,656

(22) Filed: Oct. 29, 2019

(65) Prior Publication Data

US 2020/0062504 A1 Feb. 27, 2020

Related U.S. Application Data

(63) Continuation of application No. 16/000,749, filed on Jun. 5, 2018, now Pat. No. 10,457,484, which is a (Continued)

(51) Int. Cl.
*G06F 7/00* (2006.01)
*B65G 1/137* (2006.01)
*B65G 1/04* (2006.01)

(52) U.S. Cl.
CPC ......... *B65G 1/1373* (2013.01); *B65G 1/0492* (2013.01)

(58) Field of Classification Search
None
See application file for complete search history.

(56) References Cited

U.S. PATENT DOCUMENTS 1,887,667 A 11/1932 Wheeler
2,877,575 A 3/1959 Stedt
(Continued)

FOREIGN PATENT DOCUMENTS

CN 101068729 11/2007
DE 2150500 4/1973
(Continued)

OTHER PUBLICATIONS

International Search Report, International Application No. PCT/US2014/030217, dated Jul. 7, 2014.

*Primary Examiner* — Yolanda R Cumbess
(74) *Attorney, Agent, or Firm* — Perman & Green, LLP

(57) ABSTRACT

An autonomous rover including a frame having a first end and a second end longitudinally spaced from the first end and forming a payload bay, the payload bay being sized to support a pickface, a common active registration surface configured to engage the pickface, and a drive section connected to the common active registration surface, the drive section being configured to variably position the common active registration surface relative to at least one storage shelf of an automated storage and retrieval system to effect placement of the pickface on the storage shelf so that pickfaces are substantially continuously arranged along the at least one storage shelf with a predetermined storage spacing between the pickfaces.

28 Claims, 26 Drawing Sheets

Related U.S. Application Data continuation of application No. 15/798,216, filed on Oct. 30, 2017, now Pat. No. 9,988,213, which is a continuation of application No. 14/215,310, filed on Mar. 17, 2014, now Pat. No. 9,802,761.

(60) Provisional application No. 61/790,801, filed on Mar. 15, 2013.

(56) References Cited

U.S. PATENT DOCUMENTS

| | | |
|---|---|---|
| 2,945,604 A | 7/1960 | Kroll et al. |
| 3,016,154 A | 1/1962 | Ugolini et al. |
| 3,161,303 A | 12/1964 | Burrows |
| 3,554,390 A | 1/1971 | Saul |
| 3,581,915 A | 6/1971 | Saul |
| 3,738,506 A | 6/1973 | Cornford et al. |
| 3,845,715 A | 11/1974 | Hochstrasser |
| 3,876,095 A | 4/1975 | Stedt |
| 4,064,986 A | 12/1977 | Bertovich |
| 4,307,988 A | 12/1981 | Page et al. |
| 4,394,104 A | 7/1983 | Camerini et al. |
| 4,415,975 A | 11/1983 | Burt |
| 4,428,708 A | 1/1984 | Burt |
| 4,492,504 A | 1/1985 | Hainsworth |
| 4,678,390 A | 7/1987 | Bonneton et al. |
| 4,777,416 A | 10/1988 | George, II et al. |
| 4,856,263 A | 8/1989 | Schneider et al. |
| 4,883,401 A | 11/1989 | Kavieff |
| 4,909,697 A | 3/1990 | Bernard, II et al. |
| 4,967,370 A | 10/1990 | Stern et al. |
| 4,987,992 A | 1/1991 | Pfleger |
| 5,220,263 A | 6/1993 | Onishi et al. |
| 5,273,392 A | 12/1993 | Bernard, II et al. |
| 5,323,098 A | 6/1994 | Hamaguchi et al. |
| 5,337,880 A | 8/1994 | Claycomb et al. |
| 5,350,270 A | 9/1994 | Stallard et al. |
| 5,370,492 A | 12/1994 | Gleyze et al. |
| 5,395,206 A | 3/1995 | Cerny, Jr. |
| 5,509,538 A | 4/1996 | Spindler et al. |
| 5,548,516 A | 8/1996 | Gudat et al. |
| 5,559,696 A | 9/1996 | Borenstein |
| 5,611,422 A | 3/1997 | Harkonen |
| 5,615,992 A | 4/1997 | Proske et al. |
| 5,664,929 A | 9/1997 | Esaki et al. |
| 5,709,291 A | 1/1998 | Nishino et al. |
| 5,718,322 A | 2/1998 | Mulhern |
| 5,798,920 A | 8/1998 | Crucius et al. |
| 5,801,506 A | 9/1998 | Netzler |
| 5,810,540 A | 9/1998 | Castaldi |
| 5,974,348 A | 10/1999 | Rocks |
| 6,061,607 A | 5/2000 | Bradley et al. |
| 6,149,366 A | 11/2000 | Deandrea |
| 6,164,045 A | 12/2000 | Focke et al. |
| 6,170,635 B1 | 1/2001 | Rommelli |
| 6,213,704 B1 | 4/2001 | White et al. |
| 6,257,826 B1 | 7/2001 | Neagle et al. |
| 6,289,260 B1 | 9/2001 | Bradley et al. |
| 6,295,922 B1 | 10/2001 | Salamone et al. |
| 6,377,867 B1 | 4/2002 | Bradley et al. |
| 6,394,260 B1 | 5/2002 | Barth et al. |
| 6,397,990 B1 | 6/2002 | Brien et al. |
| 6,463,360 B1 | 10/2002 | Terada et al. |
| 6,496,755 B2 | 12/2002 | Wallach et al. |
| 6,503,043 B1 | 1/2003 | Smith et al. |
| 6,597,143 B2 | 7/2003 | Song et al. |
| 6,663,334 B2 | 12/2003 | Warhurst et al. |
| 6,764,373 B1 | 7/2004 | Osawa et al. |
| 6,836,701 B2 | 12/2004 | McKee |
| 6,859,682 B2 | 2/2005 | Naka et al. |
| 6,922,632 B2 | 7/2005 | Foxlin |
| 7,039,501 B2 | 5/2006 | Freeman et al. |
| 7,054,716 B2 | 5/2006 | McKee et al. |
| 7,066,291 B2 | 6/2006 | Martins et al. |
| 7,069,124 B1 | 6/2006 | Whittaker et al. |
| 7,101,139 B1 | 9/2006 | Benedict |
| 7,133,746 B2 | 11/2006 | Abramson et al. |
| 7,137,593 B2 | 11/2006 | Baatz |
| 7,284,652 B2 | 10/2007 | Zeitler et al. |
| 7,329,081 B2 | 2/2008 | Baker et al. |
| 7,332,890 B2 | 2/2008 | Cohen et al. |
| 7,376,487 B2 | 5/2008 | Kumhyr |
| 7,397,213 B2 | 7/2008 | Im et al. |
| 7,421,268 B2 | 10/2008 | Steiner et al. |
| 7,456,596 B2 | 11/2008 | Goodall et al. |
| 7,460,462 B2 | 12/2008 | Mejia et al. |
| 7,499,155 B2 | 3/2009 | Cappelletti |
| 7,520,376 B2 | 4/2009 | Bar |
| 7,532,947 B2 | 5/2009 | Waddington et al. |
| 7,568,572 B2 | 8/2009 | Zeitler et al. |
| 7,575,406 B2 | 8/2009 | Hofmeister et al. |
| 7,615,957 B2 | 11/2009 | Kim et al. |
| 7,653,457 B2 | 1/2010 | Bloom |
| 7,686,560 B2 | 3/2010 | Laurin et al. |
| 7,693,757 B2 | 4/2010 | Zimmerman |
| 7,695,235 B1 | 4/2010 | Rallis |
| 7,706,917 B1 | 4/2010 | Chiappetta et al. |
| 7,725,213 B2 | 5/2010 | Hysell et al. |
| 7,725,253 B2 | 5/2010 | Foxlin |
| 7,729,801 B2 | 6/2010 | Abramson |
| 7,771,152 B2 | 8/2010 | Waltersbacher |
| 7,783,383 B2 | 8/2010 | Eliuk et al. |
| 7,826,919 B2 | 11/2010 | D'Andrea et al. |
| 7,826,920 B2 | 11/2010 | Stevens et al. |
| 7,845,486 B2 | 12/2010 | Spencer et al. |
| 7,856,290 B2 | 12/2010 | Kumhyr |
| 7,861,844 B2 | 1/2011 | Hayduchok et al. |
| 7,873,469 B2 | 1/2011 | D'Andrea et al. |
| 7,894,940 B2 | 2/2011 | Kumhyr |
| 7,931,431 B2 | 4/2011 | Benedict et al. |
| 7,941,244 B2 | 5/2011 | Somin et al. |
| 7,944,368 B2 | 5/2011 | Carter et al. |
| 7,959,395 B2 | 6/2011 | Hofmeister et al. |
| 7,963,384 B2 | 6/2011 | Lafontaine |
| 7,972,102 B2 | 7/2011 | Ward et al. |
| 7,988,398 B2 | 8/2011 | Hofmeister et al. |
| 7,991,505 B2 | 8/2011 | Lert, Jr. et al. |
| 8,006,824 B2 | 8/2011 | Wada et al. |
| 8,024,064 B1 | 9/2011 | Sanghavi et al. |
| 8,028,822 B2 | 10/2011 | Braunstein |
| 8,046,103 B2 | 10/2011 | Abramson et al. |
| 8,046,160 B2 | 10/2011 | Carter et al. |
| 8,047,756 B2 | 11/2011 | Tuffs et al. |
| 2002/0037208 A1 | 3/2002 | Patrito |
| 2002/0124389 A1 | 9/2002 | Matson |
| 2004/0088081 A1 | 5/2004 | Song et al. |
| 2004/0238326 A1 | 12/2004 | Lichti |
| 2005/0238455 A1 | 10/2005 | Toteff |
| 2005/0238465 A1 | 10/2005 | Razumov |
| 2007/0061041 A1 | 3/2007 | Zweig |
| 2007/0065258 A1 | 3/2007 | Benedict et al. |
| 2007/0065259 A1 | 3/2007 | Talley |
| 2007/0071585 A1 | 3/2007 | Henkel |
| 2007/0114975 A1 | 5/2007 | Cohen et al. |
| 2007/0125727 A1 | 6/2007 | Winkler |
| 2007/0267998 A1 | 11/2007 | Cohen et al. |
| 2008/0007203 A1 | 1/2008 | Cohen et al. |
| 2008/0024274 A1 | 1/2008 | Ishida et al. |
| 2008/0025833 A1 | 1/2008 | Baker et al. |
| 2008/0044262 A1 | 2/2008 | Kim et al. |
| 2008/0075357 A1 | 3/2008 | Yoon et al. |
| 2008/0080963 A1 | 4/2008 | Bufano et al. |
| 2008/0129445 A1 | 6/2008 | Kraimer et al. |
| 2008/0174268 A1 | 7/2008 | Koo et al. |
| 2008/0281717 A1 | 11/2008 | Kortelainen |
| 2009/0033316 A1 | 2/2009 | Hosek et al. |
| 2009/0074545 A1 | 3/2009 | Lert, Jr. et al. |
| 2009/0085741 A1 | 4/2009 | Ravi et al. |
| 2009/0148259 A1 | 6/2009 | Shani |
| 2009/0224750 A1 | 9/2009 | Hosek et al. |
| 2009/0265031 A1 | 10/2009 | Tachibana et al. |
| 2009/0284245 A1 | 11/2009 | Kirby et al. |
| 2009/0315501 A1 | 12/2009 | Li et al. |
| 2010/0114363 A1 | 5/2010 | Cardoni |

(56) References Cited

U.S. PATENT DOCUMENTS

| | | |
|---|---|---|
| 2010/0118149 A1 | 5/2010 | Levin et al. |
| 2010/0121481 A1 | 5/2010 | Talley et al. |
| 2010/0183409 A1 | 7/2010 | Checketts et al. |
| 2010/0185353 A1 | 7/2010 | Barwick et al. |
| 2010/0188210 A1 | 7/2010 | Howard et al. |
| 2010/0277005 A1 | 11/2010 | Karalis et al. |
| 2010/0277121 A1 | 11/2010 | Hall et al. |
| 2010/0290878 A1 | 11/2010 | Ricketts |
| 2010/0295943 A1 | 11/2010 | Cha et al. |
| 2010/0305854 A1 | 12/2010 | Kammel et al. |
| 2010/0308939 A1 | 12/2010 | Kurs |
| 2010/0316468 A1* | 12/2010 | Lert .................... B65G 1/0492 414/273 |
| 2010/0322746 A1 | 12/2010 | Lert et al. |
| 2011/0038692 A1 | 2/2011 | Hofmeister et al. |
| 2011/0043373 A1 | 2/2011 | Best et al. |
| 2011/0058926 A1 | 3/2011 | Winkler |
| 2011/0068943 A1 | 3/2011 | Lane, Jr. |
| 2011/0082583 A1 | 4/2011 | Kumhyr |
| 2011/0102144 A1 | 5/2011 | Okina et al. |
| 2011/0106295 A1 | 5/2011 | Miranda et al. |
| 2011/0118903 A1 | 5/2011 | Kraimer et al. |
| 2011/0125323 A1 | 5/2011 | Gutmann et al. |
| 2011/0148364 A1 | 6/2011 | Ota |
| 2011/0182703 A1 | 7/2011 | Alan |
| 2011/0202175 A1 | 8/2011 | Romanov et al. |
| 2011/0208350 A1 | 8/2011 | Eliuk et al. |
| 2011/0216185 A1 | 9/2011 | Laws et al. |
| 2011/0238206 A1 | 9/2011 | Somin et al. |
| 2011/0254503 A1 | 10/2011 | Widmer et al. |
| 2011/0285349 A1 | 11/2011 | Widmer et al. |
| 2011/0297509 A1 | 12/2011 | Taylor |
| 2012/0179337 A1* | 7/2012 | Doan .................... G05D 1/0891 701/49 |
| 2012/0195720 A1 | 8/2012 | Sullivan et al. |

FOREIGN PATENT DOCUMENTS

| | | |
|---|---|---|
| DE | 10356563 | 6/2005 |
| EP | 0995704 | 4/2000 |
| EP | 1193195 | 4/2002 |
| EP | 1818286 | 8/2007 |
| JP | 44016419 | 7/1969 |
| JP | 60183405 | 9/1985 |
| JP | 61094905 | 5/1986 |
| JP | 03111335 | 5/1991 |
| JP | 1991111335 | 5/1991 |
| JP | 4065211 | 6/1992 |
| JP | 7187329 | 7/1995 |
| JP | 07187329 | 7/1995 |
| JP | 8009055 | 1/1996 |
| JP | 2001084037 | 3/2001 |
| JP | 2003012119 | 1/2003 |
| JP | 2005119332 | 5/2005 |
| JP | 2005138956 | 6/2005 |
| JP | 2005154067 | 6/2005 |
| JP | 2008100777 | 1/2008 |
| JP | 2010520076 | 6/2010 |
| JP | 2012211019 | 11/2012 |
| TW | 393437 | 11/2000 |
| WO | 2005071597 | 8/2005 |
| WO | 2008107769 | 9/2008 |
| WO | 2010118412 | 10/2010 |

\* cited by examiner

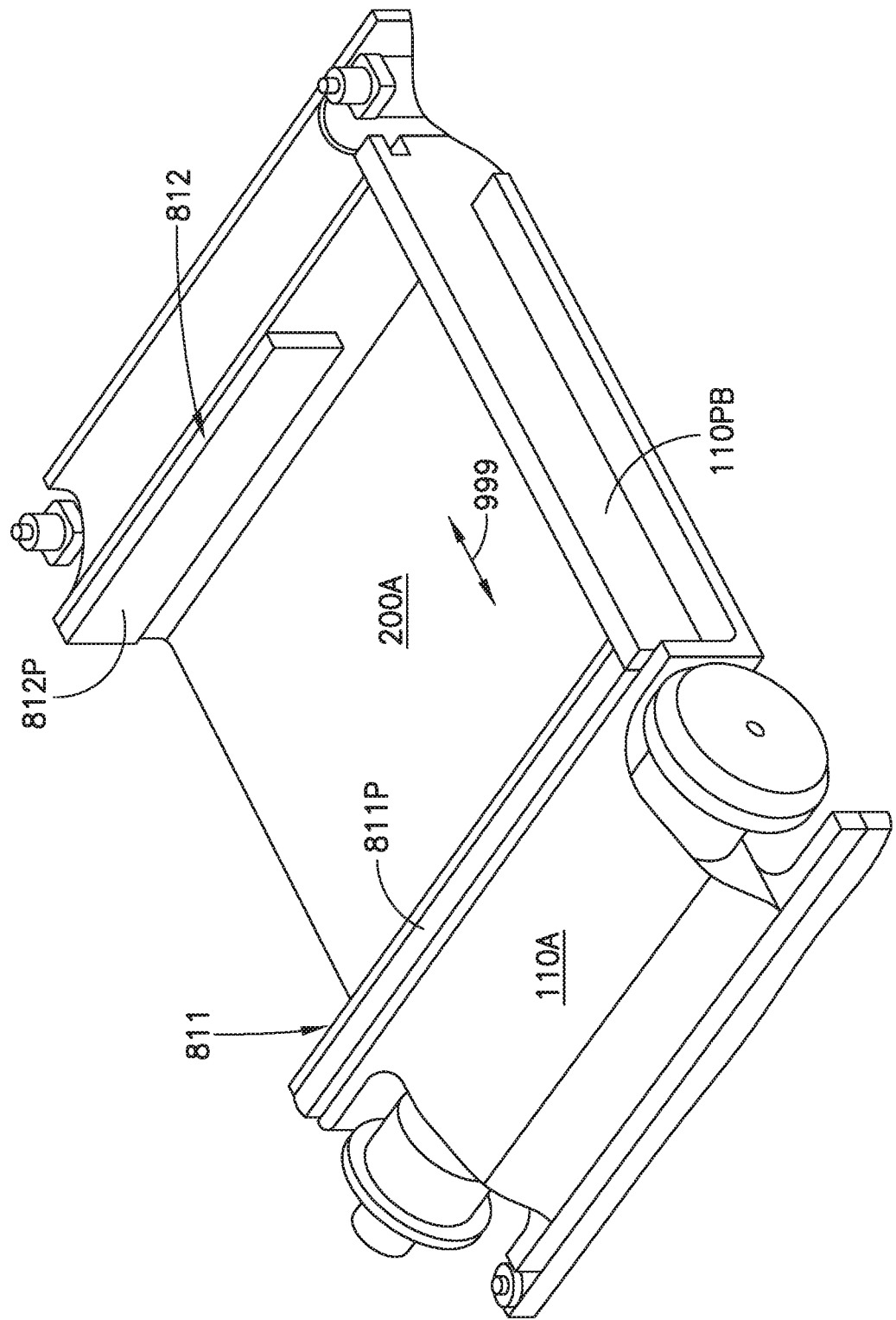

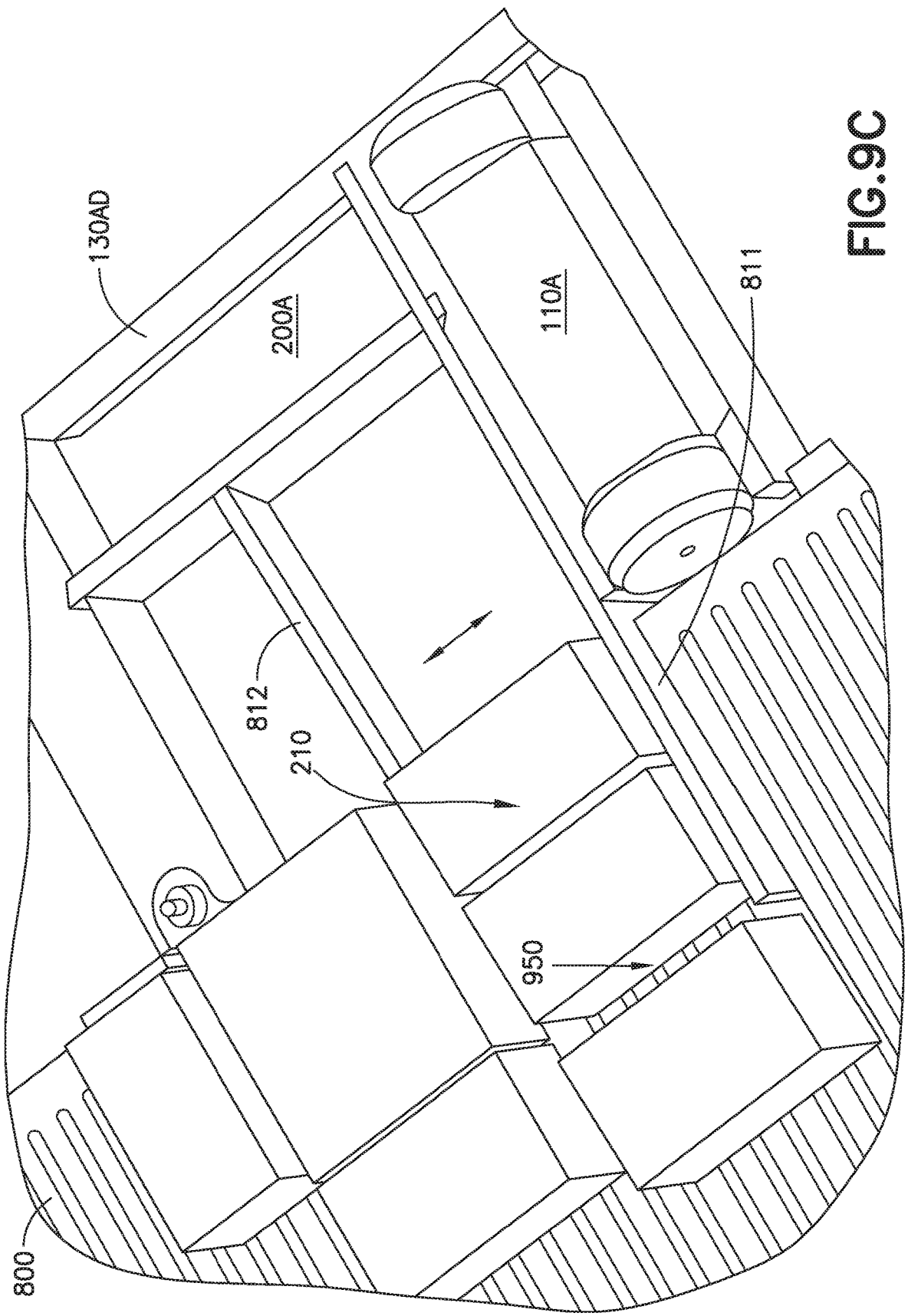

AUTOMATED STORAGE AND RETRIEVAL SYSTEM

CROSS-REFERENCE TO RELATED APPLICATIONS

This application is a continuation of U.S. Non-Provisional patent application Ser. No. 16/000,749 filed on Jun. 5, 2018, which is a continuation of U.S. Non-Provisional patent application Ser. No. 15/798,216 filed on Oct. 30, 2017 (now U.S. Pat. No. 9,988,213), which is a continuation of U.S. Non-Provisional patent application Ser. No. 14/215,310 filed on Mar. 17, 2014 (now U.S. Pat. No. 9,802,761), which claims the benefit of and priority from U.S. Provisional Patent Application No. 61/790,801 filed on Mar. 15, 2013, the disclosures of which are incorporated herein by reference in their entireties.

BACKGROUND

1. Field

The exemplary embodiments generally relate to material handling systems and, more particularly, to transport and storage of items within the material handling systems.

2. Brief Description of Related Developments

Generally the storage of items within, for example, a warehouse requires a large building or storage structure space with an associated footprint. Automated vehicles or robots may be used in these warehouses to place items in storage and remove items from storage.

It would be advantageous to have an automated vehicle that can efficiently pick items for removal from the storage structure. It would also be advantageous to have an automated vehicle that can access multiple storage levels so that a storage density of the storage structure may be increased.

BRIEF DESCRIPTION OF THE DRAWINGS

The foregoing aspects and other features of the disclosed embodiments are explained in the following description, taken in connection with the accompanying drawings, wherein:

FIG. 9 is a schematic illustration of an autonomous rover in accordance with aspects of the disclosed embodiment;

FIGS. 9A-9D are schematic illustrations of a portion of the automated storage and retrieval system in accordance with aspects of the disclosed embodiment;

DETAILED DESCRIPTION

Figure 1:
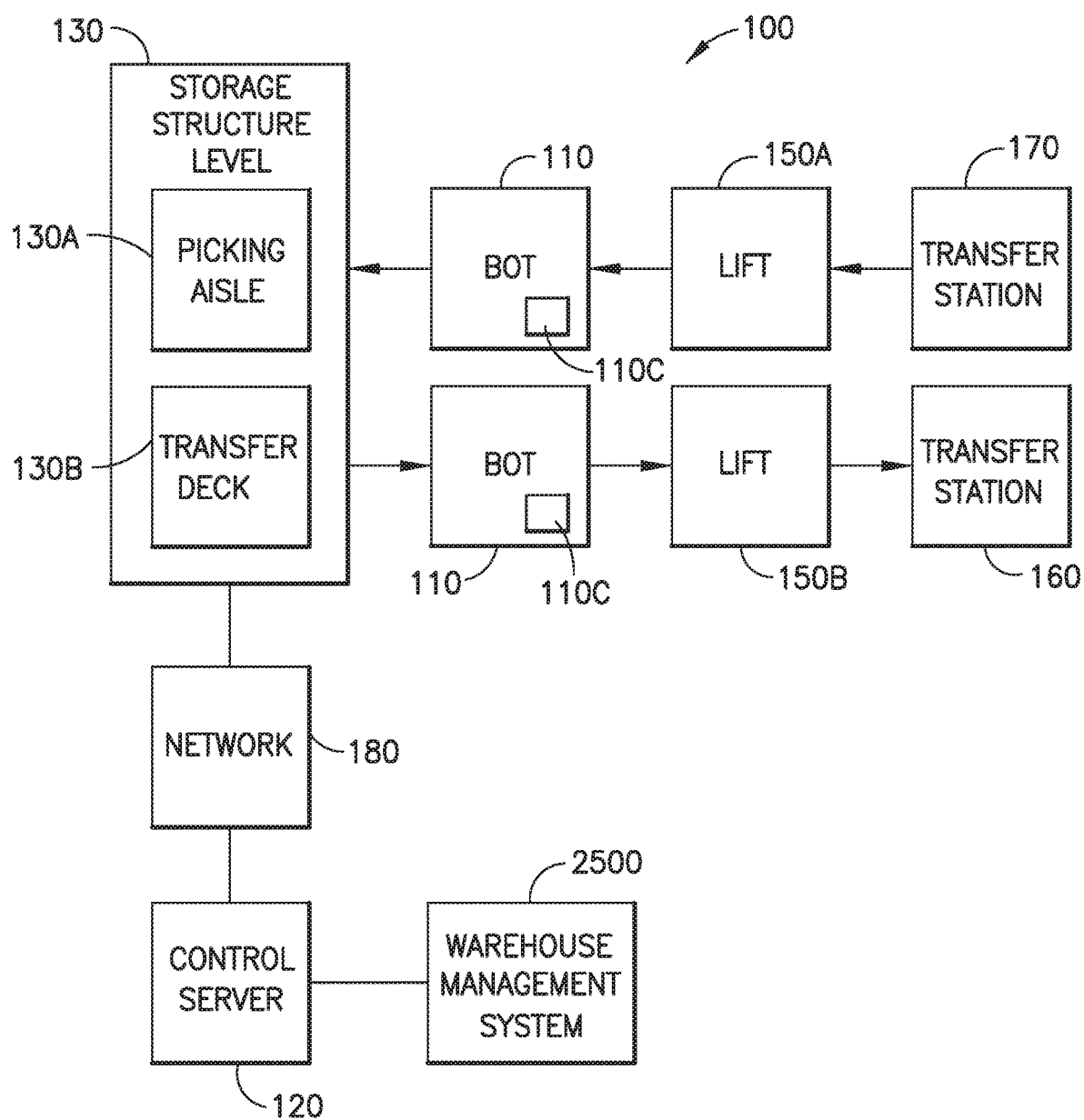
FIG. 1 is a schematic illustration of an automated storage and retrieval system in accordance with aspects of the disclosed embodiment.

FIG. 1 schematically illustrates a storage and retrieval system in accordance with an aspect of the disclosed embodiment. Although the aspects of the disclosed embodiment will be described with reference to the drawings, it should be understood that the aspects of the disclosed embodiment can be embodied in many alternate forms. In addition, any suitable size, shape or type of elements or materials could be used.

In accordance with aspects of the disclosed embodiment the storage and retrieval system 100 may operate in a retail distribution center or warehouse to, for example, fulfill orders received from retail stores for case units such as those described in U.S. patent application Ser. No. 13/326,674 filed on Dec. 15, 2011, the disclosure of which is incorporated by reference herein in its entirety.

The storage and retrieval system 100 may include in-feed and out-feed transfer stations 170, 160, input and output vertical lifts 150A, 150B (generally referred to as lifts 150), a storage structure 130, and a number of autonomous rovers 110. The storage structure 130 may include multiple levels of storage rack modules where each level includes respective storage or picking aisles 130A, and transfer decks 130B for transferring case units (e.g. provided on a respective level) (FIG. 16, Block 1600) between any of the storage areas of the storage structure 130 and any shelf of the lifts 150. The storage aisles 130A, and transfer decks 130B are also configured to allow the rovers 110, provided on a respective level (FIG. 16, Block 1601), to traverse the storage aisles 130A and transfer decks 130B for placing case units into picking stock and to retrieve ordered case units.

The rovers 110 may be any suitable autonomous vehicles capable of carrying and transferring case units throughout the storage and retrieval system 100. Suitable examples of rovers can be found in, for exemplary purposes only, U.S. patent application Ser. No. 13/326,674 filed on Dec. 15, 2011; U.S. patent application Ser. No. 12/757,312 filed on Apr. 9, 2010; U.S. patent application Ser. No. 13/326,423 filed on Dec. 15, 2011; U.S. patent application Ser. No. 13/326,447 filed on Dec. 15, 2011; U.S. patent application Ser. No. 13/326,505 Dec. 15, 2011; U.S. patent application Ser. No. 13/327,040 filed on Dec. 15, 2011; U.S. patent application Ser. No. 13/326,952 filed on Dec. 15, 2011; and U.S. patent application Ser. No. 13/326,993 filed on Dec. 15, 2011, the disclosures of which are incorporated by reference herein in their entireties. The rovers 110 may be configured to place case units, such as the above described retail merchandise, into picking stock in the one or more levels of the storage structure 130 and then selectively retrieve ordered case units for shipping the ordered case units to, for example, a store or other suitable location.

The rovers 110 and other suitable features of the storage and retrieval system 100 may be controlled by, for example, one or more central system control computers (e.g. control server) 120 through, for example, any suitable network 180. The network 180 may be a wired network, a wireless network or a combination of wireless and wired networks using any suitable type and/or number of communication protocols. In one aspect, the control server 120 may include a collection of substantially concurrently running programs that are configured to manage the storage and retrieval system 100 including, for exemplary purposes only, controlling, scheduling, and monitoring the activities of all active system components, managing inventory and pickfaces, and interfacing with the warehouse management system 2500.

Figure 2:
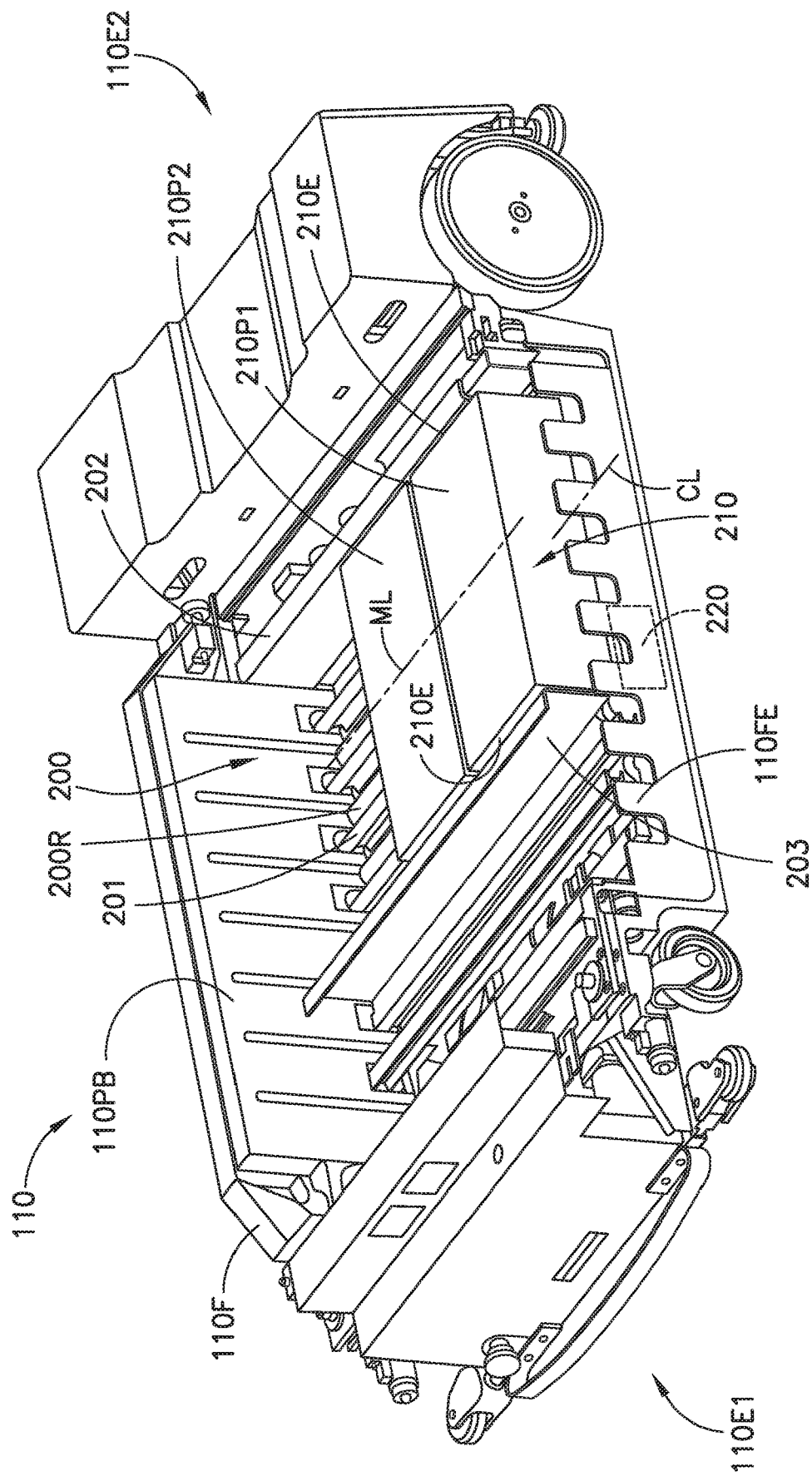
FIG. 2 is a schematic illustration of an autonomous rover in accordance with aspects of the disclosed embodiment.

Referring now to FIG. 2 the rover 110 may include a frame 110F having a first end 110E1 and a second end 110E2 longitudinally spaced from the first end 110E1. The frame 110F forms a payload bay 200 configured to support a pickface within the payload bay 200 in any suitable manner. In one aspect laterally arranged rollers 200R may support the pickface and allow the pickface to move in the longitudinal direction within the payload bay. It is noted that a "pickface" as used herein may be one or more merchandise case units placed one behind the other, side by side, or a combination thereof.

The rover 110 may include one or more active registration members 202, 203 such as movable blades or fences having surface(s) that engage pickface edges or side surfaces 210E and provide positive longitudinal registration of the pickface as a unit with respect to rover frame and/or a global reference frame of the automated storage and retrieval system. Positive pickface registration through engagement and movement of pickface side surfaces 210E by a common active registration surface of the one or more registration members 202, 203 resolves position variance that may be possible with friction registration, and achieves reliable pickface positioning/placement decoupling the positioning/placement of the pickface from (e.g. relative to) the rover frame 110F. The one or more registration members may also enable consistent continuous rack storage utility.

The registration members 202, 203 may be disposed at least partly within the payload bay 200 for positioning the pickface at a predetermined position relative to one or more of the frame 110F or a storage shelf 300 (FIG. 3A) of the a storage rack module. In one aspect the registration member 202, 203 may be common to the case unit(s) forming the pickface. The registration members 202, 203 may be pusher plates or blades that engage sides of the pickface 210 for positioning the pickface. The registration members 202, 203 may also be active in the sense that at least one of the registration members 202, 203 may be longitudinally movable within the payload bay. For example, as can be seen in FIG. 2, registration member 202 may be fixed relative to the frame while registration member 203 is movable relative to the frame 110F in the longitudinal direction. In other aspects both of the registration members 202, 203 may be movable relative to the frame 110F in the longitudinal direction.

Any suitable drive section 220, which will be described below, may be connected to the frame for driving one or more of the registration members 202, 203 in any suitable manner such that described below. The rover 110 may include any suitable controller 110C that is connected to the drive section for controlling movement of at least one of the registration members 202, 203. In one aspect, where one registration member 202 is fixed and the other registration member 203 is movable, the controller may control the movable registration member 203 so that it snugs the pickface against the fixed registration member 202. The controller may know a width of the pickface (which may be determined in any suitable manner such as a look up table, sensors, a longitudinal position of the movable registration blade within the payload bay, etc.) so that the boundaries of the pickface in at least the longitudinal direction are known and the position of the pickface can be determined based on the location of the fixed registration member 202. In other aspects, where both registration members 202, 203 are movable the controller 110C may control the movement of the registration members 202, 203 so that an average position of the registration members 202, 203 (e.g. the mid-line ML of the space between the registration members 202, 203) substantially matches (e.g. lies along the same line) the location (e.g. the centerline CL of the pickface 210 with respect to the longitudinal direction of the rover) where the pickface 210 is to be located within the payload bed 200. Snugging the pickface (e.g. holding the pickface with the registration members 202, 203 and/or pressing one or more case unit(s) 210P1, 210P2 of the pickface 210 together for alignment) may also be controlled by the controller 110C using any suitable force feedback to control a magnitude of the snugging force. The controller 110C may monitor current from one or more motors of the drive section and use the current alone or with, for example, a Kalman filter (or other force estimation algorithm or sensor) to control the snugging force.

Figure 3A:
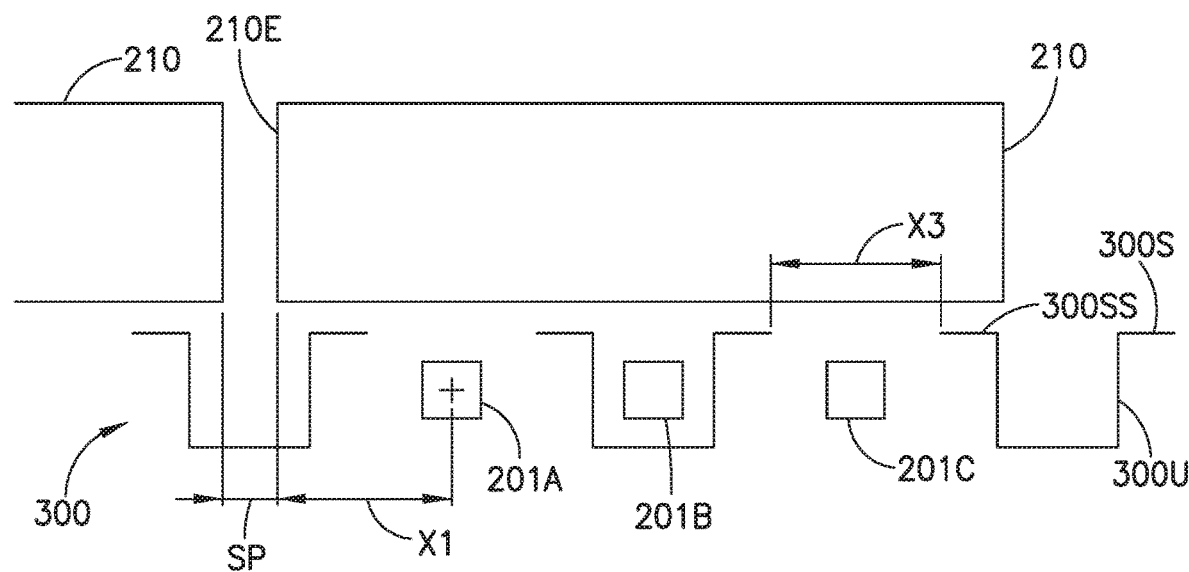
FIGS. 3A and 3B are schematic illustrations of a portion of the storage and retrieval system in accordance with aspects of the disclosed embodiment.
Figure 3B:
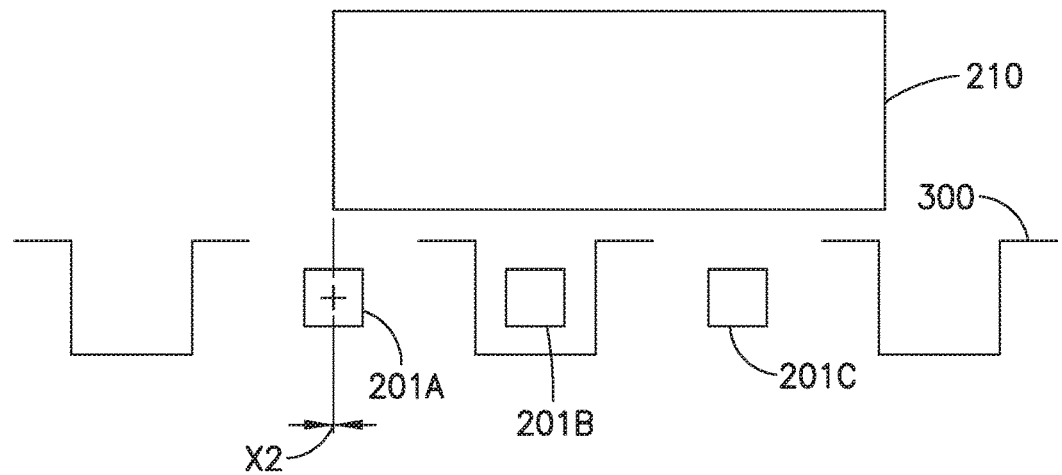

Still referring to FIG. 2 and also to FIGS. 3A and 3B, the rover may include any suitable end effector movably connected to the frame 110F for transferring the pickface 210 to and from the payload bay 200. In one aspect the end effector includes movable fingers 201A, 201B, 201C (generally referred to as fingers 201) that may lift and transport the pickface 210 to and from the payload bay 200. The controller 110C may position the registration members 202, 203 so that an edge or side surface of the pickface 210E is positioned a predetermined distance X1, X2 from a finger, such as finger 201A or any other suitable reference datum of the payload bay 200, frame 110F or global reference frame of the automated storage and retrieval system. This may be referred to as the case offset. The case offset may range from substantially zero to any suitable predetermined distance X1 so as to provide any suitable spacing between pickfaces on the support surfaces 300S of storage shelves 300. The positioning of the case unit or pickface with the registration members 202, 203 allows for a minimized spacing or gap SP between adjacent case units or pickfaces. In one aspect registration of the case unit or pickface with the registration members 202, 203 may allow placement of the case unit or pickface on the storage shelf 300 in predetermined position relative to a feature of the storage shelf 300. For example, the support surface 300S of storage shelf 300 may be formed from discontinuous support surfaces 300SS where each portion of the support surface 300S is supported by upright members 300U that are substantially channel shaped to allow the fingers 201 to be inserted between the upright members 300U where the fingers travel vertically between the discontinuous support surfaces 300SS. In one aspect the registration of the case units or pickface may be with respect to at least a global reference frame of the automated storage and retrieval system for placing an edge 210E the case unit or pickface at a predetermine distance from a discontinuous support surface 300SS so that a predetermined spacing SP exits between adjacent case units or pickfaces. The spacing SP may be any suitable spacing and in one aspect is less than a distance X3 between the discontinuous support surface 300SS. In one aspect the spacing SP may be a minimized spacing that provides only sufficient clearance between adjacent case units or pickfaces to allow contactless insertion or removal of the case units or pickfaces to and from the allocated storage space.

Figure 4:
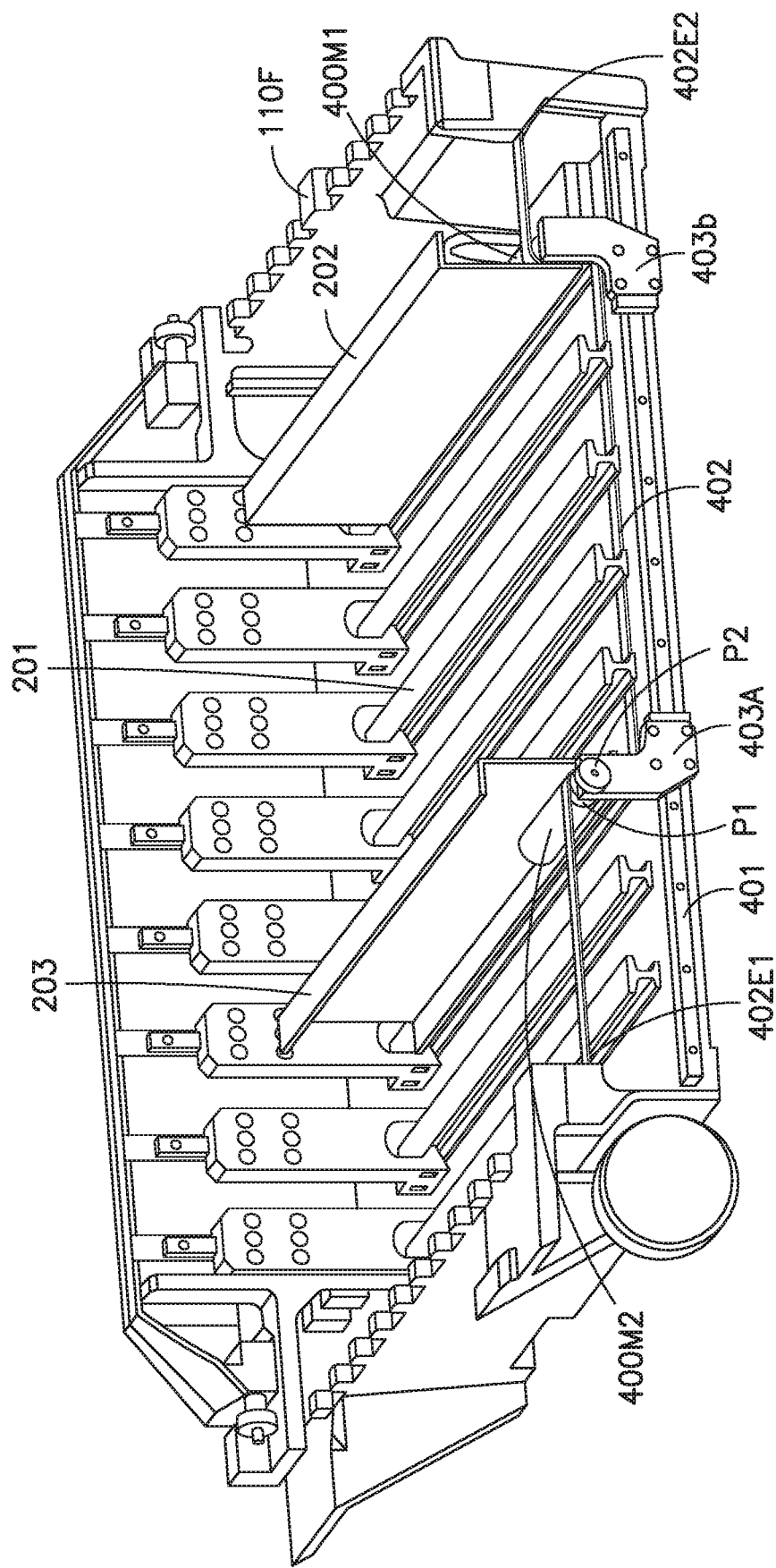
FIG. 4 is a schematic illustration of a portion of the autonomous rover of FIG. 2 in accordance with aspects of the disclosed embodiment.

Referring now to FIG. 4 a portion of the rover 110 is illustrated in accordance with aspects of the disclosed embodiment. As can be seen in FIG. 4 each registration member 202, 203 is movably mounted to a linear guide member 401 in any suitable manner. For example, a sliding coupler 403A, 403B (e.g. one coupler for each registration member 202, 203) may be movably mounted to the linear guide member 401. The sliding coupler 403A, 403B may be coupled to a respective registration member 202, 203 so that the registration member 202, 203 is supported on a single side of the registration member 202, 203 (e.g. cantilevered from the linear guide member 401) to allow longitudinal movement of the registration members above the rollers 200R (or other pickface support) and the fingers 201. The linear guide member 401 may be mounted below the payload bed pickface support surface (e.g. such as rollers 200R).

The drive section 220A may be a two degree of freedom drive section. In other aspects the drive section may have more or less than two degrees of freedom. As can be seen in FIG. 4 the drive section includes a common drive member 402 that is fixed at one end 402E1 to the frame 110F and fixed at the other end 402E2 to an opposite end of the frame 110F so that the common drive member is movably fixed relative to the frame 110F. The common drive member may be any suitable member such as, for example, a band, belt, wire, etc. A motor 400M1, 400M2 may be mounted to a respective registration member 202, 203 in any suitable manner. Each motor may include a drive pulley P1 and each sliding coupler may include an idler pulley P2 to form a pulley pair. The common drive member 402 may serpentine around the drive pulley P1 and idler pulley P2 of each pulley pair and be tensioned in any suitable manner so that engagement between the drive pulley P1 and the common drive member 402 causes longitudinal movement of a respective registration member 202, 203 when a corresponding motor 400M1, 400M2 is actuated. As may be realized, the motors 400M1, 400M2 may be any suitable motors such as, for example, a stepper motor. The controller 110C may control each motor to generate relative motion between the registration members 202, 203 and the frame 110F for snugging and positioning the pickface using an open control loop (e.g. through motor commands) or a closed control loop (using position data from one or more sensors). As may be realized, any suitable sensors may be disposed on the frame 110F for obtaining a position of one or more of the registration members 202, 203 relative to, for example, the frame. In one aspect an encoder may be placed along the linear guide member 401 or on the idler pulleys P2 to provide position data to the controller.

Referring to FIG. 4B, another two degree of freedom drive section is shown in accordance with another aspect of the disclosed embodiment. The operation of the drive section shown in FIG. 4B may be substantially similar to that described above however; the motors 400M1, 400M2 may be mounted to the frame 110F in any suitable manner. In this aspect, each motor may drive a corresponding closed loop drive member 402A, 402B (such as e.g. a belt, band, wire, etc.). For example, each motor may include a drive pulley P1 mounted to the output of the motor. A corresponding idler pulley P2 may be mounted on a longitudinally opposite side of the frame 110F. The closed loop drive member 402A, 402B may be wrapped around or otherwise engaged with its respective drive pulley P1 and idler pulley P2. Sliding coupler 403A may be coupled to closed loop drive member 402A and sliding coupler 403B may be coupled to closed loop drive member 402B so that as a respective motor 400M1, 400M2 is actuated the closed loop drive member 402A rotates around the pulleys P1, P2 for moving a respective sliding coupler 403A, 403B (and the respective registration member 202, 203).

Figure 5:
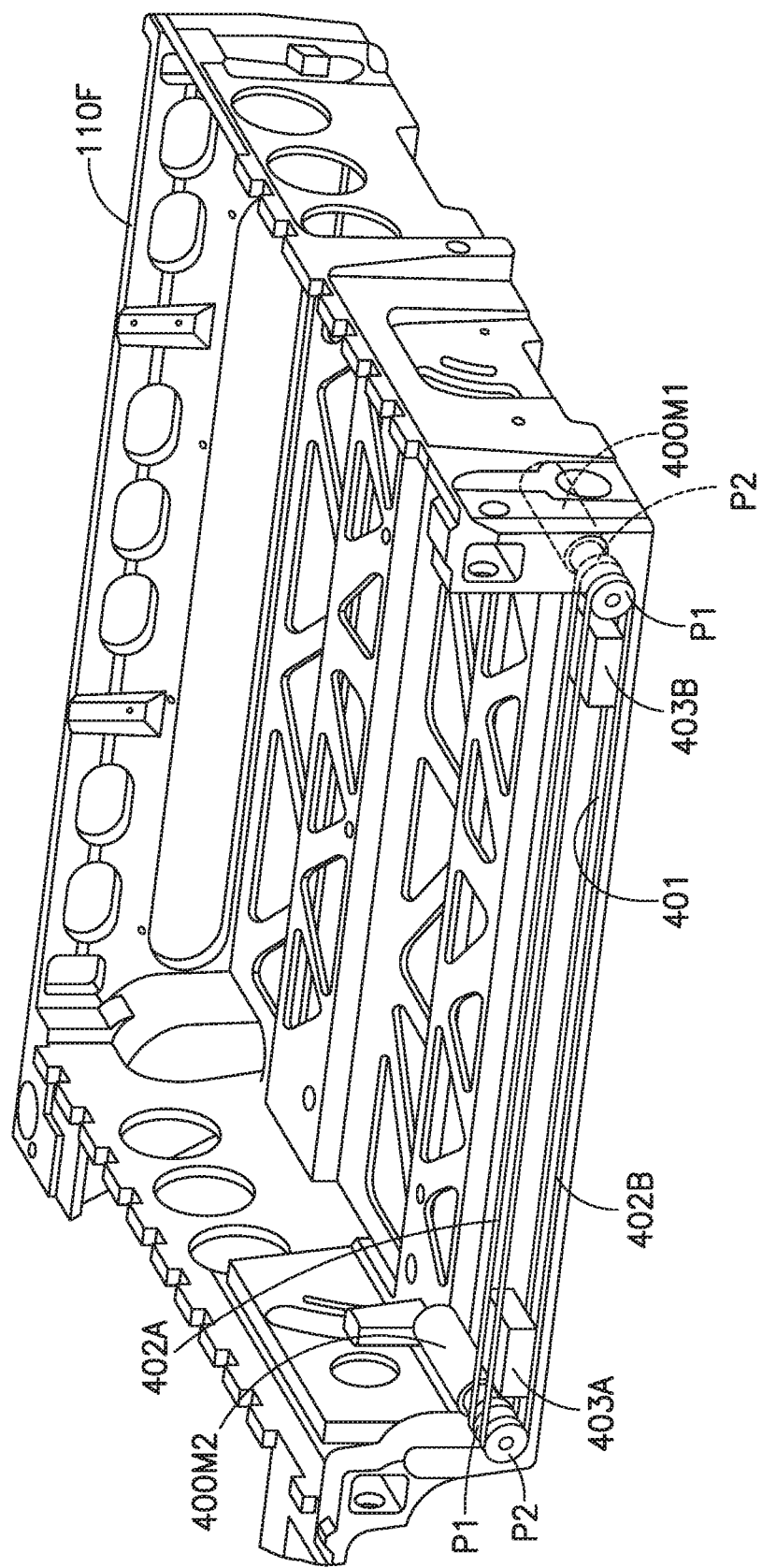
FIG. 5 is a schematic illustration of a portion of the autonomous rover of FIG. 2 in accordance with aspects of the disclosed embodiment.
Figure 6A:
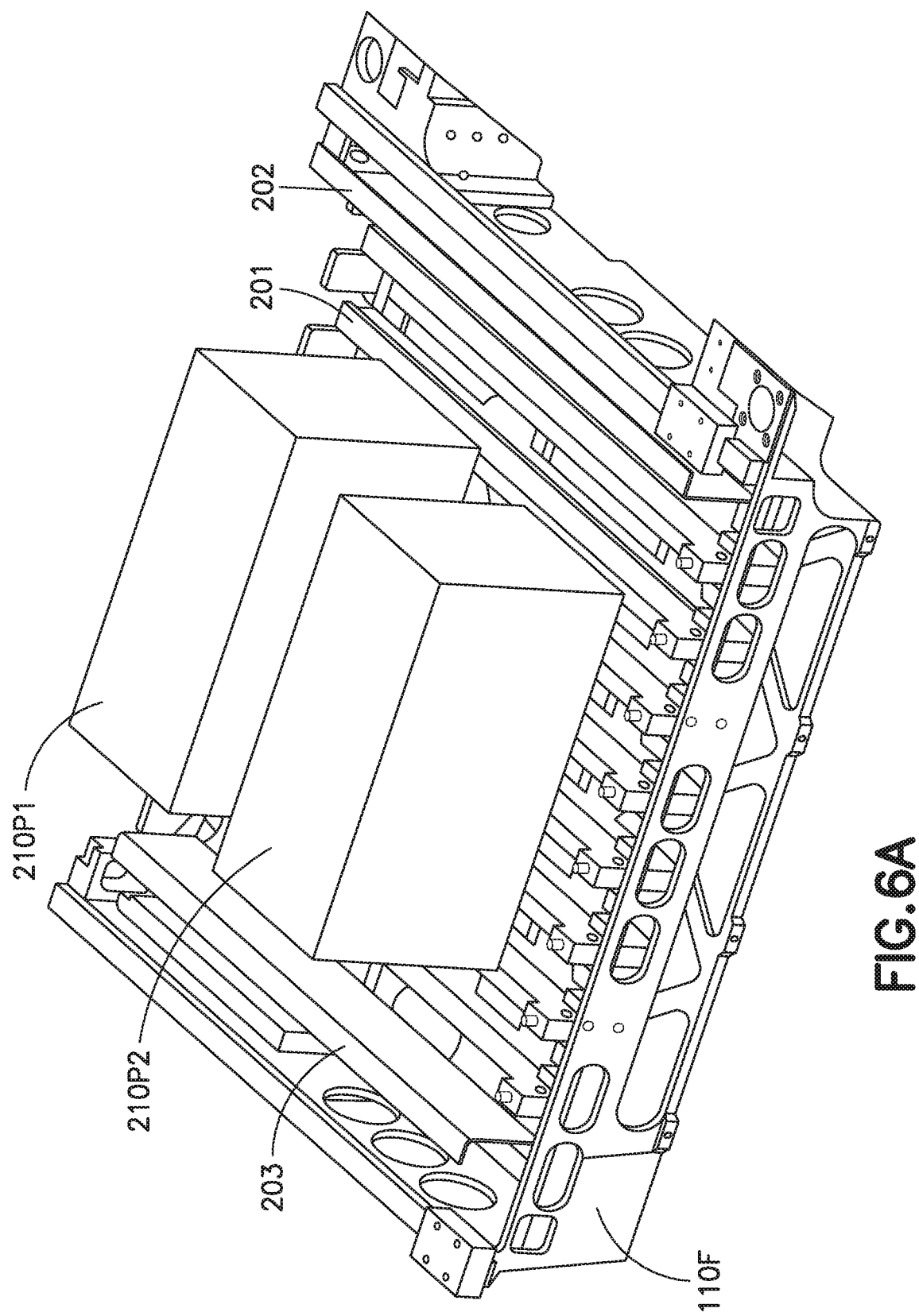
FIGS. 6A-6D are schematic illustrations of payload registration in accordance with aspects of the disclosed embodiment.
Figure 6B:
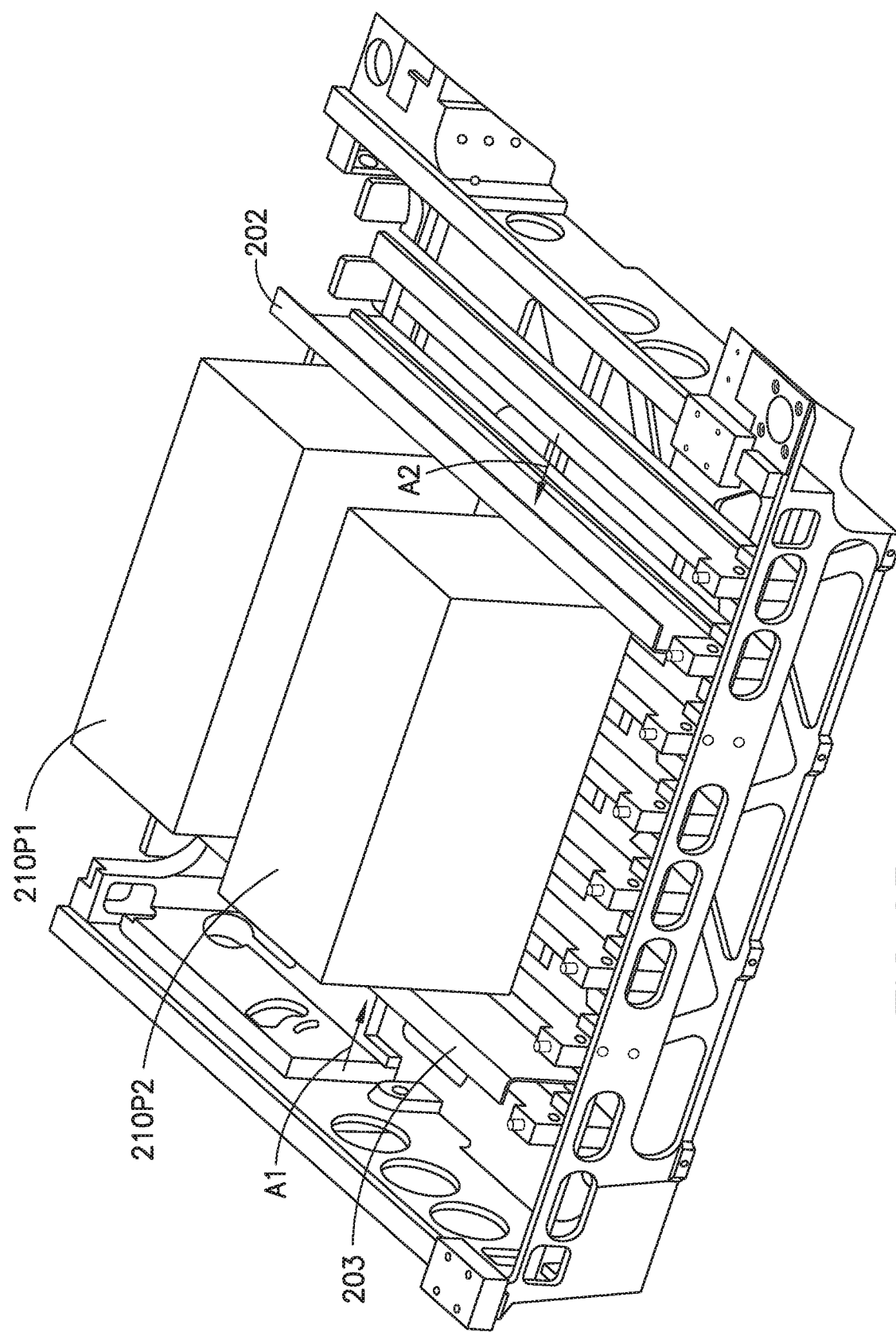
Figure 6C:
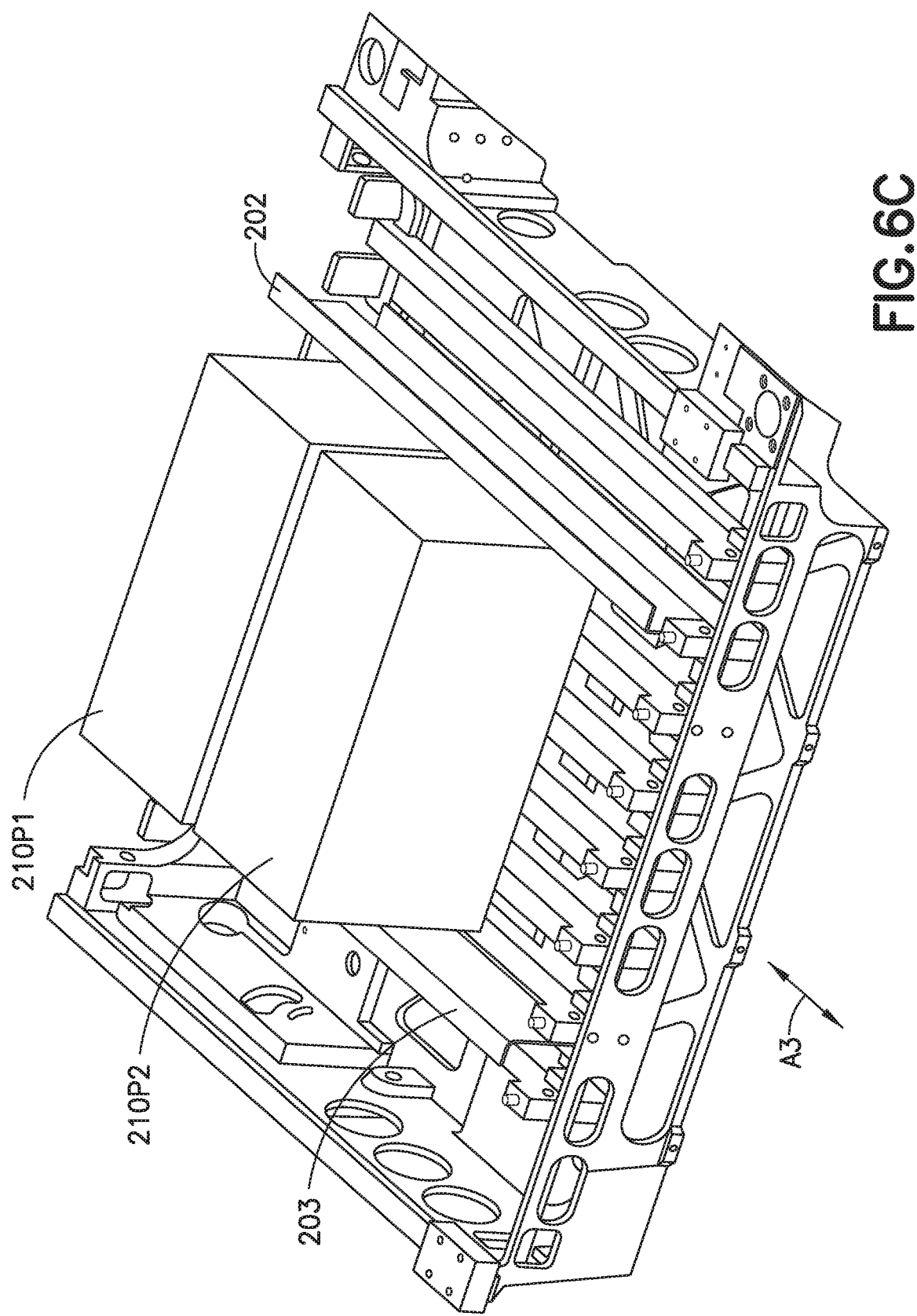
Figure 6D:
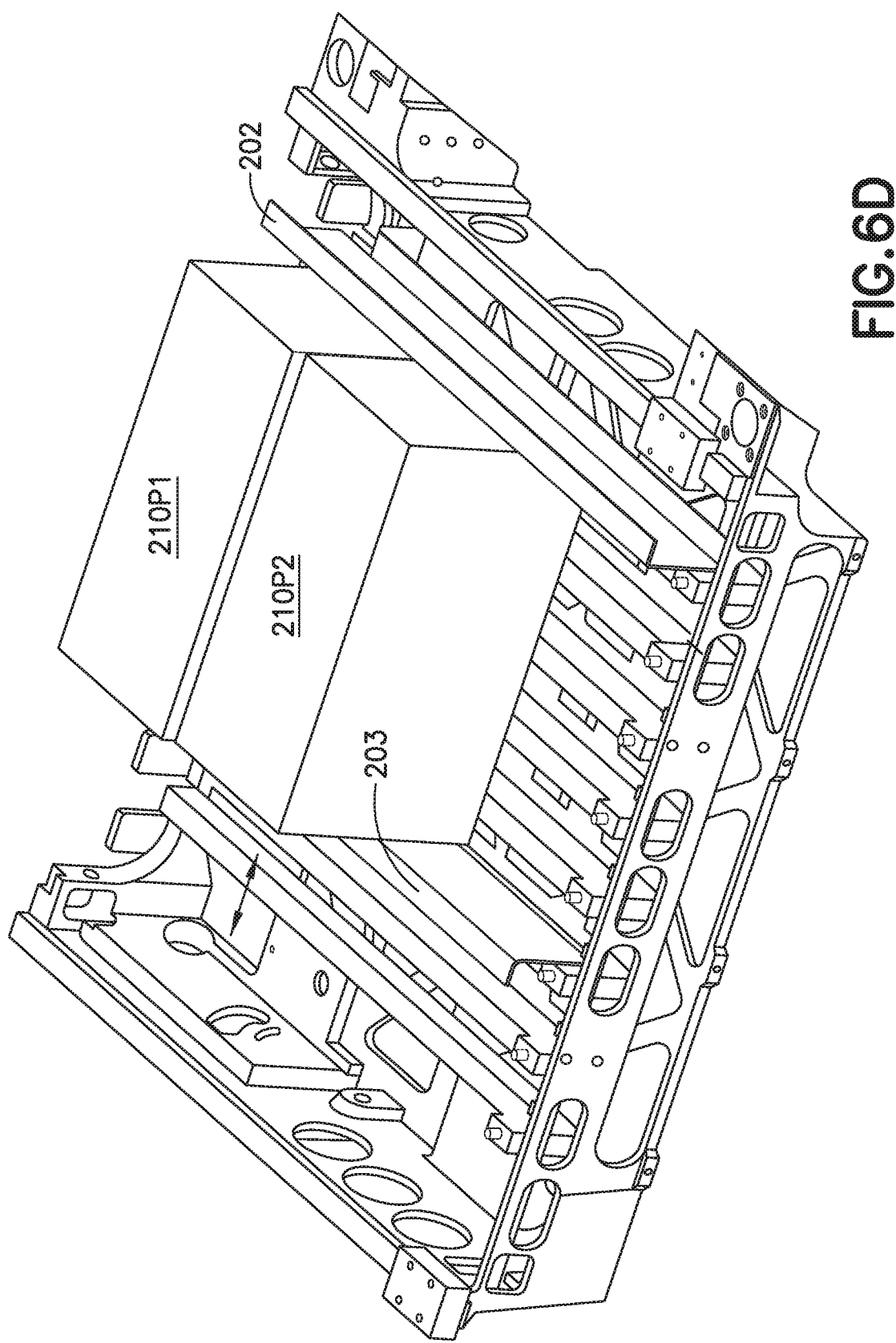

Referring to FIGS. 6A-6D the registration of a pickface on the rover 110 will be described. The fingers 201 may extend to a storage shelf 300 (FIG. 3A) and pick one or more case units 210P1, 210P2 from the same or different storage locations (e.g. of the same or different shelves for building a pickface as will be described below) for transfer of the case units 210P1, 210P2 into the payload bay 200 (FIG. 2). The fingers 201 may lower below the pickface support surface of the payload bay 200 so that the case units 21P1, 210P2 are placed on, for example, rollers 200R. The rover controller 110C may actuate the motors 400M1, 400M2 (FIGS. 4 and 5) for moving registration member 203 in the direction of arrow A1 and for moving registration member 202 in the direction of arrow A2 until the registration members contact sides of the case units 210P1, 210P2 (FIG. 6B). A snugging force, as described above, may be applied to the case units 210P1, 210P2 by the registration members 202, 203 to longitudinally align the case units 210P1, 210P2 (FIG. 6C). As may be realized the case units 210P1, 210P2 may also be snugged in the lateral direction using for example, a movable snugging member 110PB and a fixed fence 110FE as described in, for exemplary purposes only, U.S. patent application Ser. No. 12/757,312 filed on Apr. 9, 2010 the disclosure of which is incorporated herein by reference in its entirety. For example, the movable snugging member 110PB may be movably mounted to the frame for movement in the direction of arrow A3 so that the movable snugging member 110PB moves towards and away from the fence 110FE to push the case units 210P1, 210P2 against each other and/or against the fence 110FE. The fence 110FE may be fixed to the frame 110F and provide a reference datum for pickface positioning in the direction of arrow A3 (e.g. along the longitudinal axis of the rover/the direction of extension of the rover end effector). The snugged case units 210P1, 210P2 which form the pickface 210 may be longitudinally moved as a unit (FIG. 6D), e.g. in the direction of one or more of arrows A1, A2, for positioning the pickface at a predetermined longitudinal position relative to one or more of the payload bay 200, the frame 110F or a global reference frame that may define a storage position on the storage shelf 300 as defined storage space location of a storage shelf 300 (FIGS. 3A and 3B).

As described above, the rovers 110 may be configured to build pickfaces 210 including one or more case units in any suitable manner. In one aspect, the rovers are capable of picking one or more case units at one or more locations from storage shelves 300 and positioning the case units relative to, for example, the rover frame 110F or any other suitable reference frame, such as a global reference frame of the storage and retrieval system, for forming the pickface 210. The pickface 210 may be formed adjacent the storage shelf 300 from which the one or more case units were picked. As may be realized the picking of case units from the storage shelves is exemplary and in other aspects the rover may also be capable of positioning case units, picked from any suitable location or locations of an automated storage and retrieval system (such as, e.g., the lifts 150A, 150B) for placement of the case units as a unit (i.e. pickface) at any suitable predetermined location within the automated storage and retrieval system.

Figure 16:
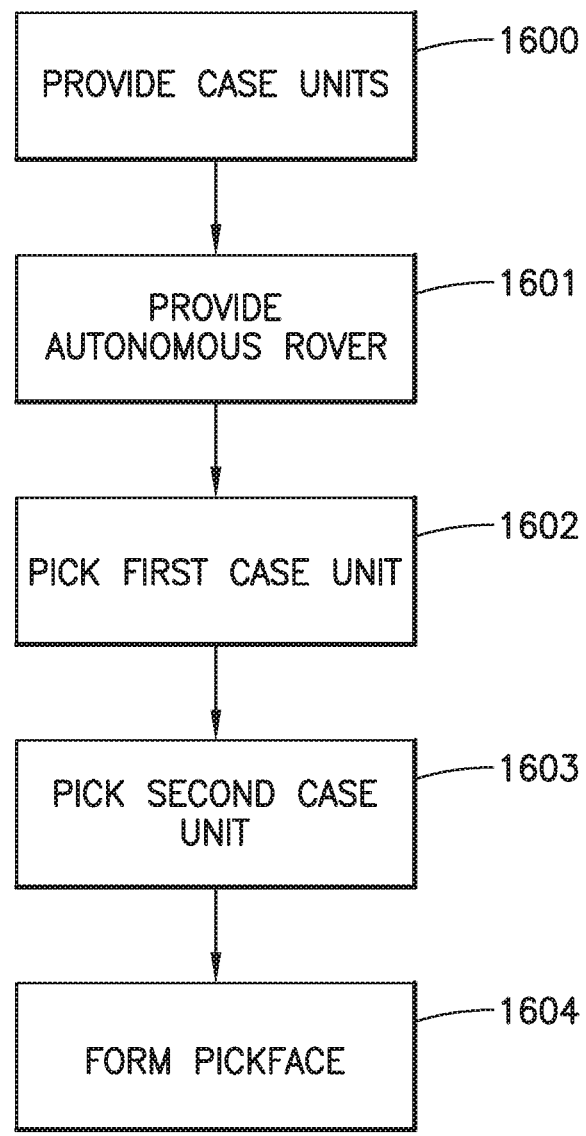
FIG. 16 is a flow diagram in accordance with aspects of the disclosed embodiment.

In one aspect, the pickface 210 may be formed adjacent or at the storage location (e.g. adjacent or at the storage shelf or other suitable storage location) upon picking of the case units from one or more storage locations of the storage shelves 300 (or any other suitable structure of the automated storage and retrieval system capable of holding case units). For example, the cases units included in the pickface 210 may be obtained from one location of the storage shelves 300 while in other aspects a case unit may be picked from a first storage location (FIG. 16, Block 1602), a second case unit may be picked from a second location (FIG. 16, Block 1603), and so on until all the desired case units are placed in the payload bay, to form the pickface 210 (FIG. 16, Block 1604). In other aspects, the pickface 210 may also be formed as each case unit is picked from one or more inbound shelves of one or more lifts 150A so that the formed pickface 210 may be placed in a storage location or, in other aspects, on an outbound shelf of a lift 150B.

Figure 7A:
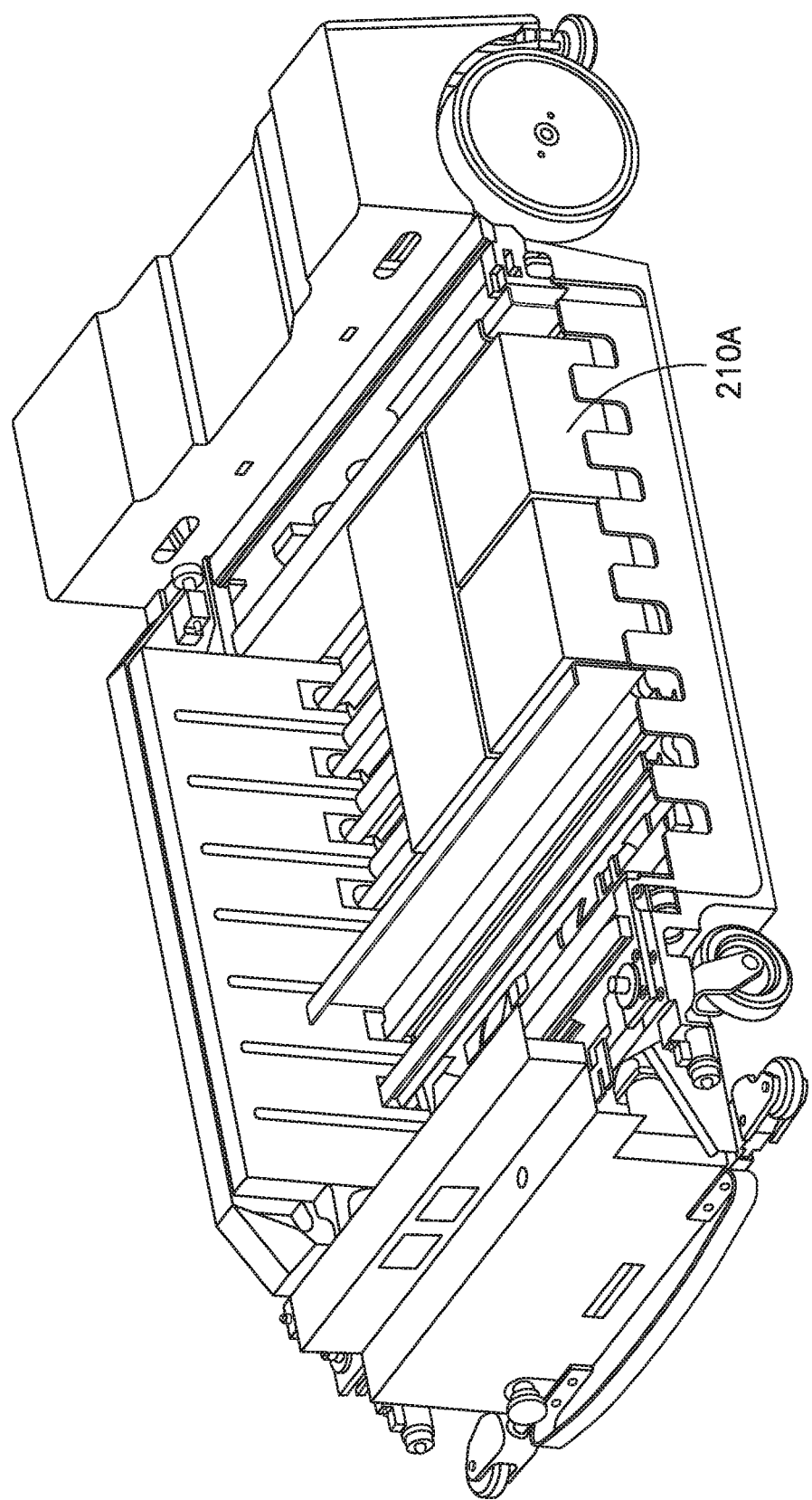
FIGS. 7A-7C are schematic illustrations of the autonomous rover of FIG. 2 in accordance with aspects of the disclosed embodiment.
Figure 7B:
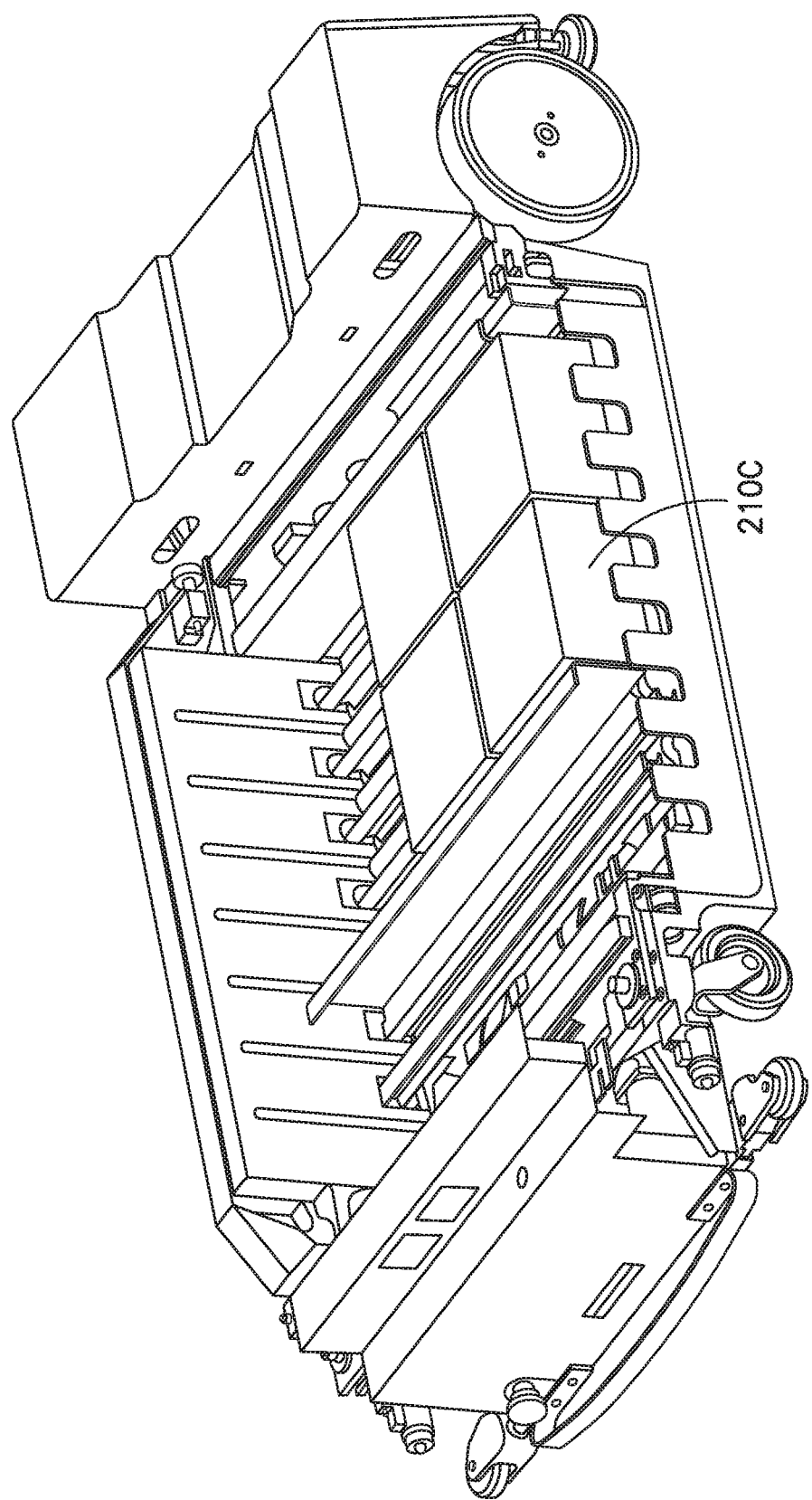
Figure 7C:
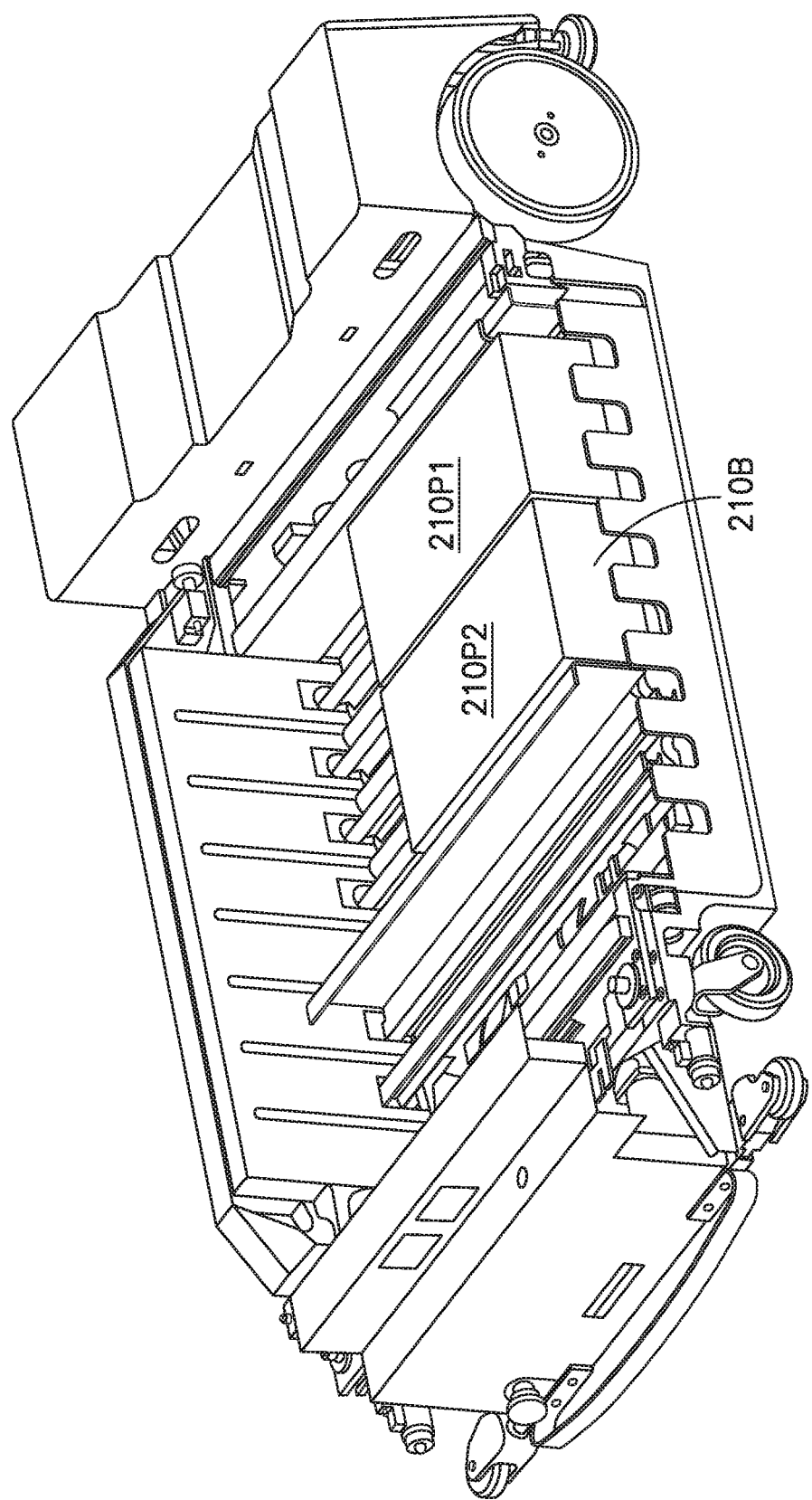

The pickface 210 may include any suitable number of case units arranged in any suitable configuration as shown in FIGS. 2 and 7A-7C. For example, the case units 210Pa, 210P2 may be arranged laterally side by side as shown in FIG. 2 to form pickface 210, longitudinally side by side as shown in FIG. 7C to form pickface 210A or in any other combination as shown in FIGS. 7A and 7B to form pickfaces 210A, 210C as long as the combination of case units forming the pickface 210, 210A, 210B, 210C allow the pickface 210, 210A, 210B, 210C to have substantially straight or otherwise substantially flat sides (e.g. the dimensions of each case unit forming the pickface are substantially complimentary to the other case units forming the pickface) so that the snugging member 110PB, fence and/or registration members 202, 203 can longitudinally and/or laterally justify the case units to form the pickface.

Figure 8:
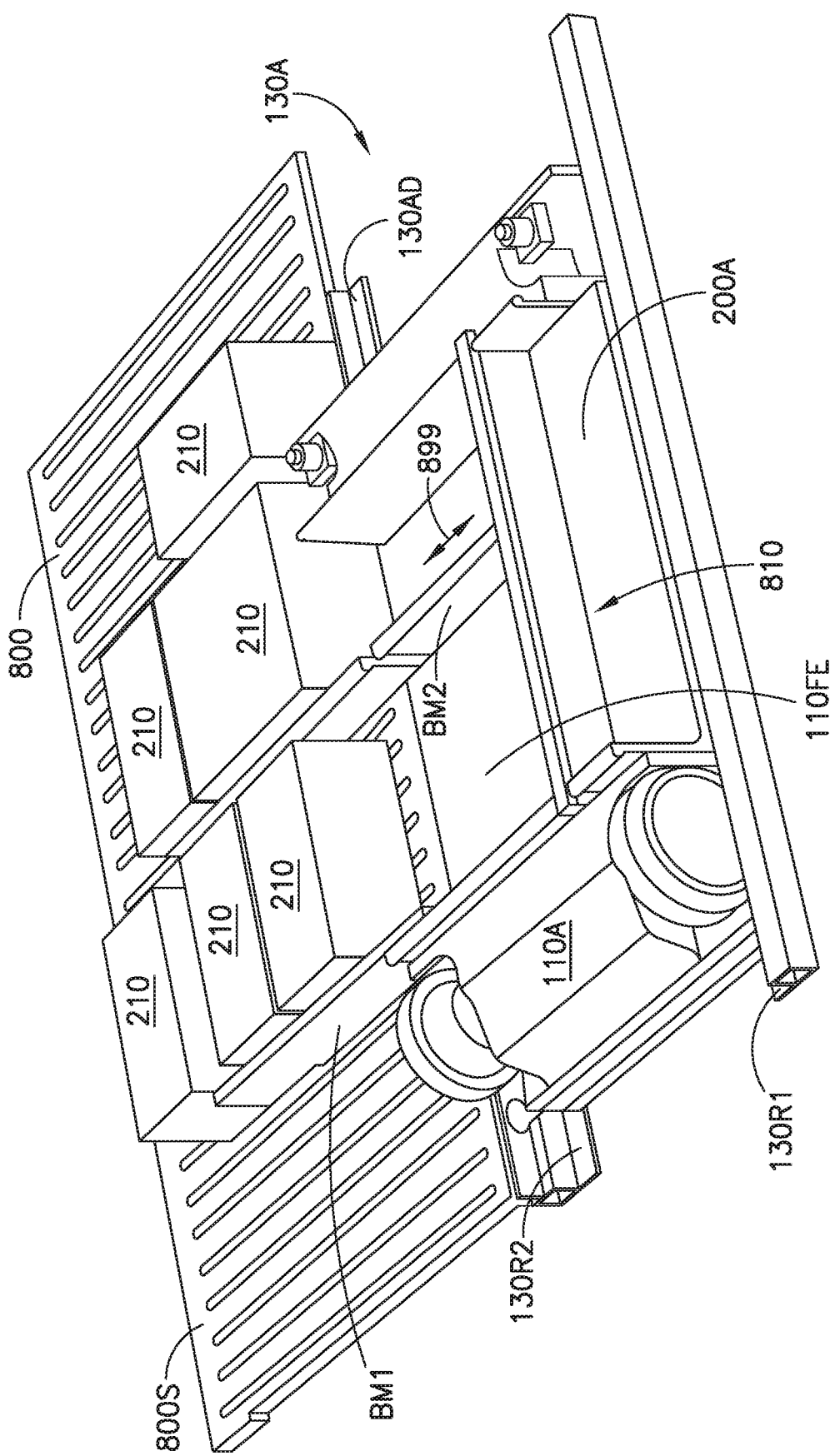
FIG. 8 is a schematic illustration of a portion of the storage and retrieval system in accordance with aspects of the disclosed embodiment.

Referring to FIG. 8 a portion of the storage and retrieval system in accordance with aspects of the disclosed embodiment is shown. In this aspect the storage shelves 800, 800A are substantially flat shelves having a substantially flat pickface support surface 800S (e.g. compared to shelf 300 in which the fingers 201 of the rover extend between uprights of the pickface support 300S). The substantially flat pickface support surface 800S may be configured for snag proof storage of pickfaces (e.g. shrink wrap or the case units themselves may not get caught on the shelves) and to allow fluids to pass through the shelves. As may be realized any suitable drip tray DT may be placed under the shelf 800 (and shelf 300) to collect fluids that pass through the shelf and to substantially prevent the fluids from contacting case units or pickfaces disposed on other storage levels beneath the shelf 800 (and shelf 300). The storage shelves in this aspect, the rover 110A may be substantially similar to rover 110 described above however, here the rover 110A includes a bladed end effector 810 that includes blades 811, 812 that are configured to grip opposing sides of the pickface and to transfer the pickface to and from the payload bed 200. As will be described in greater detail below.

Referring to FIGS. 10A, 10B, 10C and 11 the storage shelves 800 may allow for a reduction in the number of picking aisles 130A (FIG. 1), reduced rover length which will allow for a reduced transfer deck 130B (FIG. 1) size, and a reduced deck (e.g. both the transfer deck 130B and the picking aisle deck 130AD) by providing multi-level storage per picking aisle deck 130AD. The configuration of the shelves 800 may also allow for an increase in horizontal and vertical case density while positioning/registering the case units or pickfaces with the blades 811, 812 may allow for moving the pickface closer together (e.g. reducing pickface spacing as described above). Where the blades are used to transfer the case unit(s) or pickface to and from the storage shelf it is noted that the spacing between the case units allows space for the blades 811, 812 to be inserted between adjacent case units or pickfaces.

In one aspect, the shelves 800 may be constructed of, for example, stamped sheet metal or any other suitable material formed in any suitable manner. The shelves 800 may include any suitable stiffening ribs/projections 800R faced downward to utilize "dead space" (e.g. space that is otherwise not suitable for storage) between the picking aisle rails 130R1, 130R2 (that form the picking aisle deck 130AD on which the rover travels—while two individual rails 130R1, 130R2 are shown on opposite sides of the picking aisle 130A in other aspects the picking aisle deck may be a one piece deck member or any other suitable structure that spans a width of the picking aisle 130A). In other aspects the shelves may not have stiffening ribs. The stiffening ribs 800R may include an opening 10000 on the bottom to allow fluids to pass through the shelving 800. The openings 10000 of the shelves 800 may be oriented and aligned with a direction (arrow 11002) in which the pickfaces are transferred to and from the shelves 800 and include smoothed corner transitions with the substantially flat pickface support surface 800S. The stiffening ribs 800R may have any suitable shape and size. In one aspect the shape of the stiffening ribs may allow stacking of the shelves 800 during, for example, transport of the shelves 800 to customer locations (FIG. 10C) and/or for storage of the shelves 800 in any suitable location. It is noted that the shelves 800 may be affixed to the storage rack structure 11005 (FIG. 11) and/or the picking aisle deck/rails 130AD, 130R1, 130R2 in any suitable manner. In one aspect the shelves 800 may be removably fixed to the storage rack structure 11005 (FIG. 11) and/or the picking aisle deck/rails 130AD, 130R1, 130R2 with removable fasteners. In other aspects the shelves 800 may not be removable.

Figure 11:
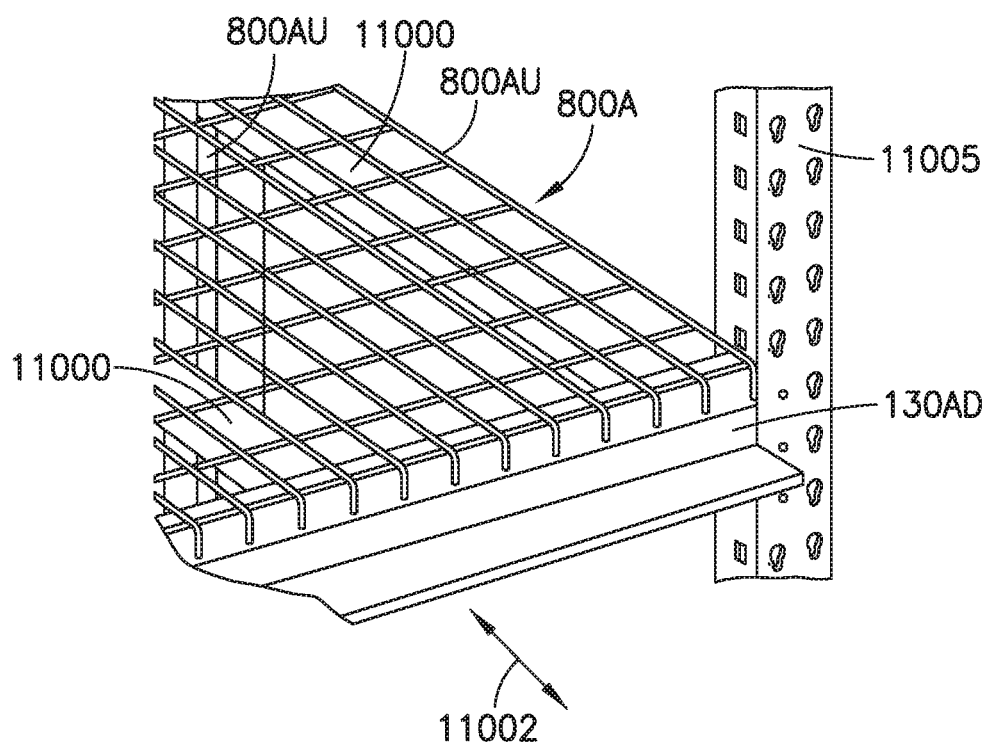
Figure 12:
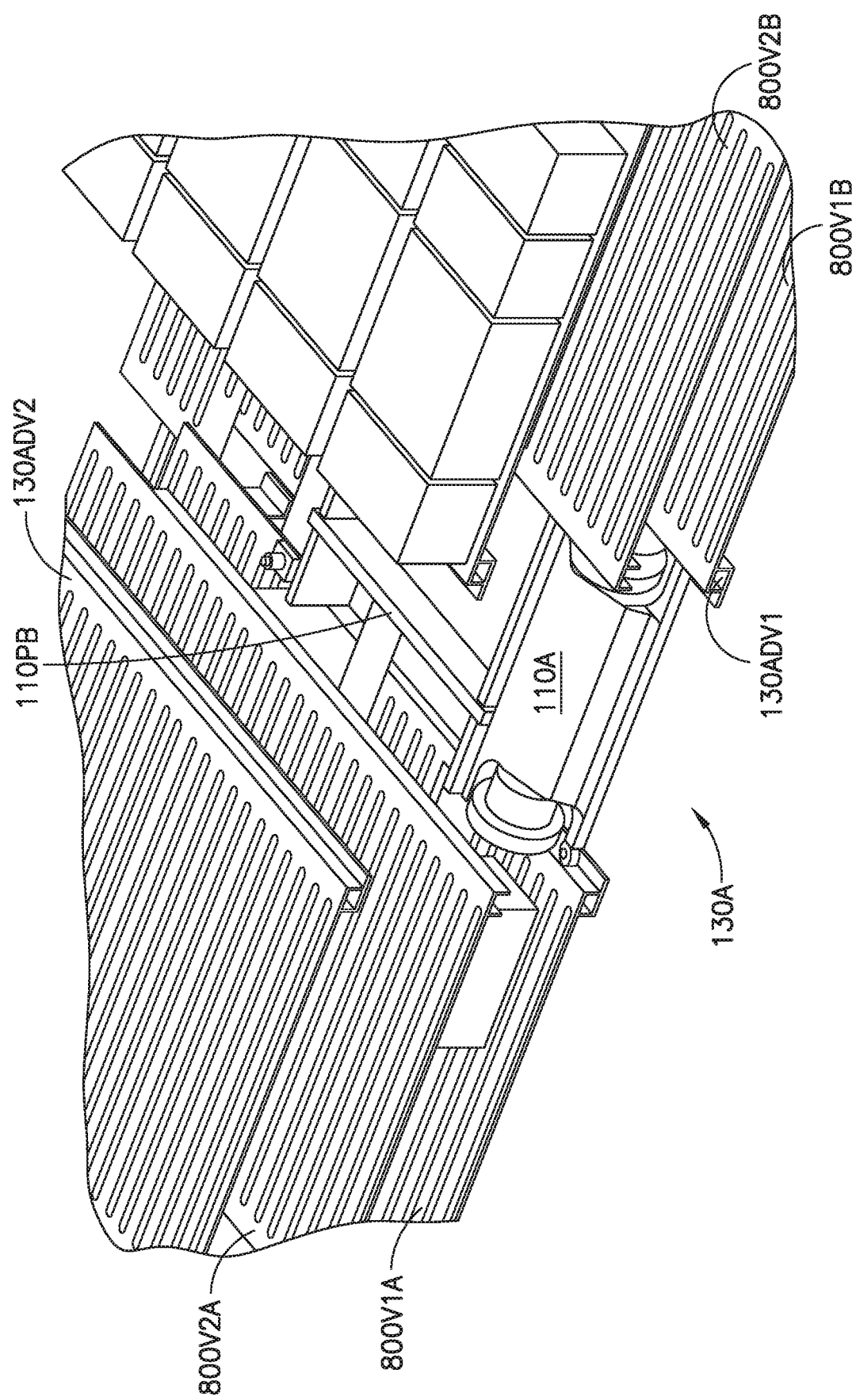
FIGS. 12-15 are schematic illustrations of a portion of the automated storage and retrieval system is shown in accordance with aspects of the disclosed embodiment.
Figure 13:
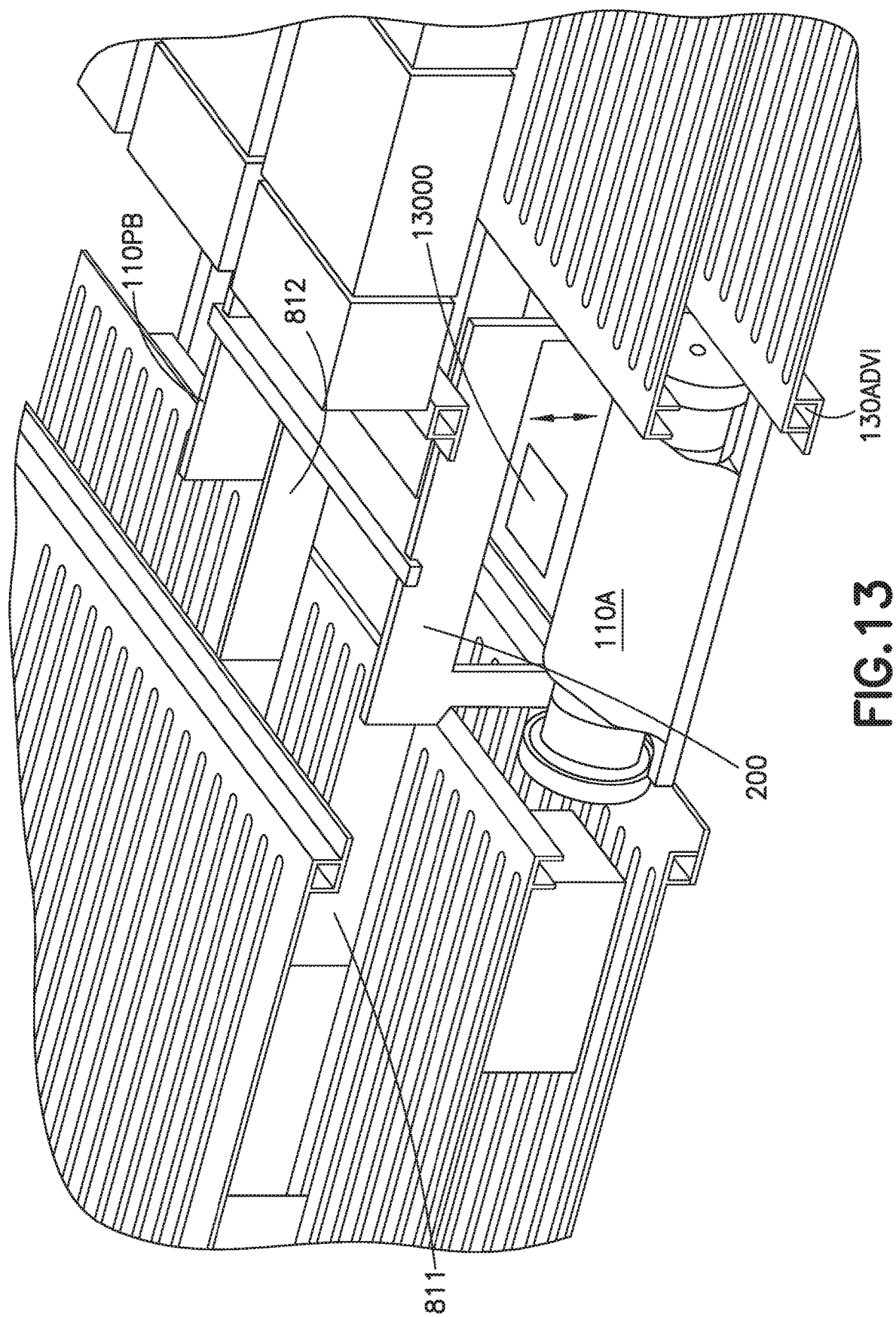
Figure 14:
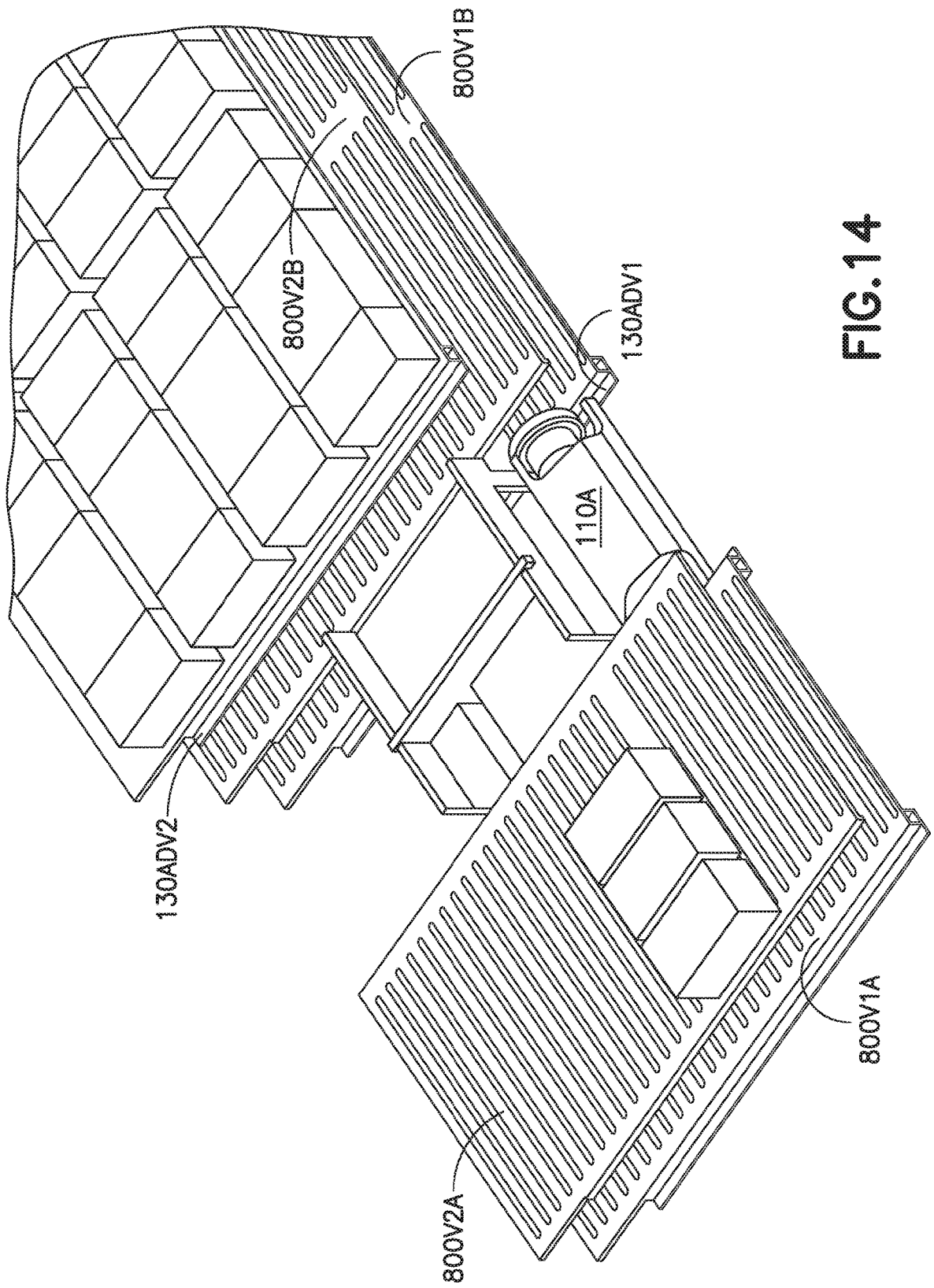
Figure 15:
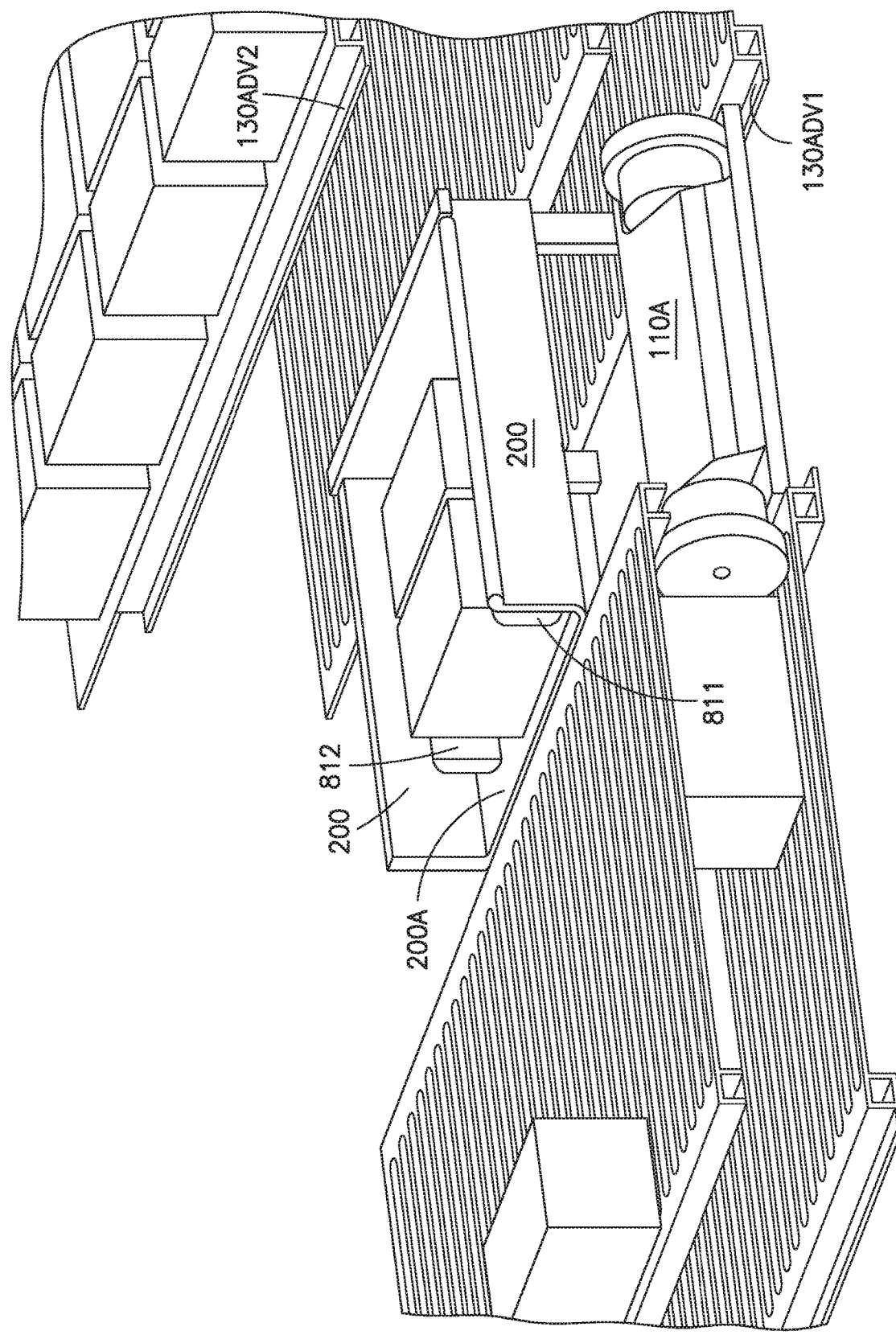

Referring to FIG. 11, in another aspect the shelves 800A may be constructed of wire (e.g. wire shelves). The wire shelves 800A may have any suitable configuration such as a wire mesh configuration where the upper members 800AU of the wire shelves 800A are oriented and aligned with a direction (arrow 11002) in which the pickfaces are transferred to and from the shelves 800A. The wire shelves 800A may be secured to the storage rack structure 11005 and/or the picking aisle deck/rails 130AD, 130R1, 130R2 in any suitable manner. In one aspect the wire shelves 800A may wrap around the storage rack structure 11005 and/or the picking aisle deck/rails 130AD, 130R1, 130R2 as shown in FIG. 11 so that the wire shelves 800A are removably fixed to the storage rack structure 11005 and/or the picking aisle deck/rails 130AD, 130R1, 130R2 substantially without fasteners or other fixing methods (e.g. adhesives, welding, etc.). In other aspects the wire shelves 800A may be removably fixed to the storage rack structure 11005 and/or the picking aisle deck/rails 130AD, 130R1, 130R2 with any removable fasteners. In other aspects the shelves 800A may not be removable.

Figure 10A:
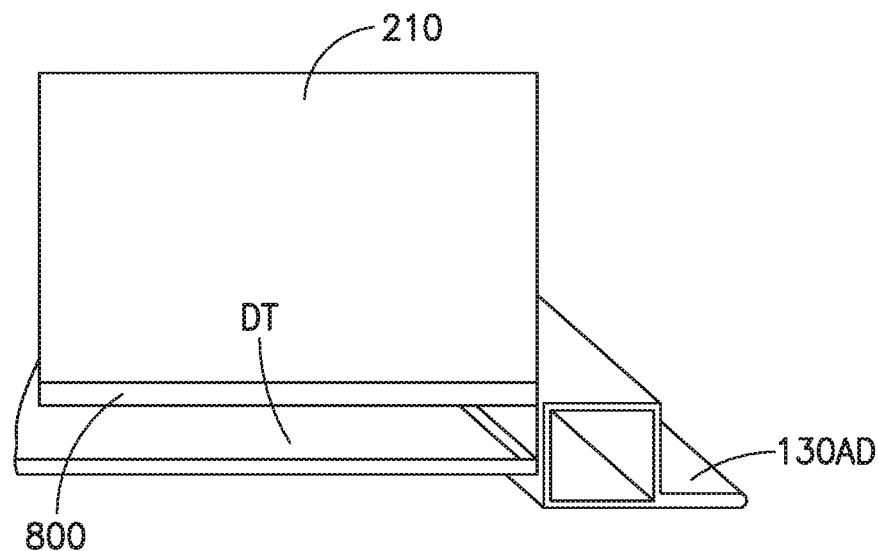
FIGS. 10A-10C and 11 are schematic illustrations of portions of the storage and retrieval system in accordance with aspects of the disclosed embodiment.
Figure 10B:
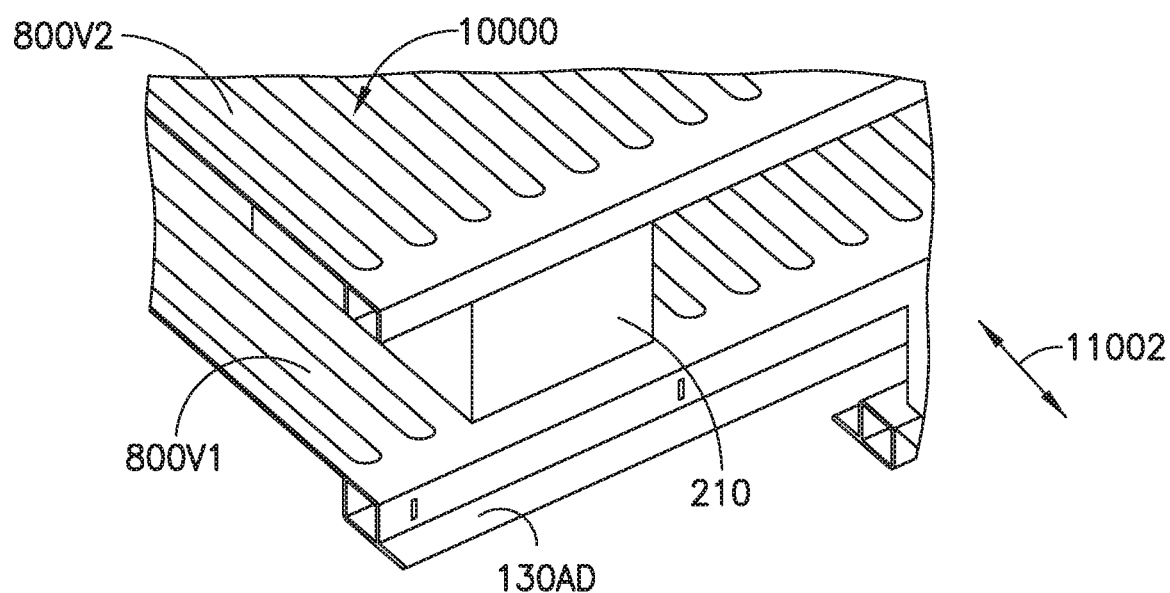
Figure 10C:
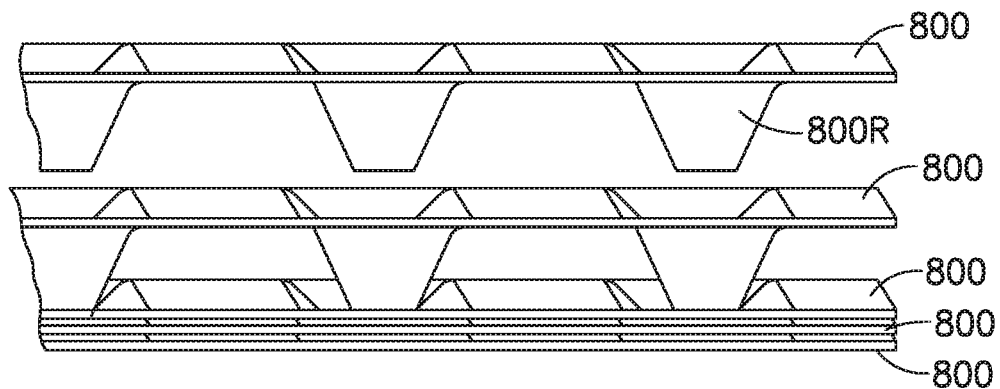

As described above, the storage shelves 800, 800A may be stacked one above the other as shown in FIG. 10B. Here there are two storage shelves 800V1, 800V2 stacked one above the other and accessible from a single picking aisle deck 130AD. In other aspects there may be more than two stacked storage shelves that are accessible from a single picking aisle deck 130AD.

Referring now to FIGS. 9, 9A, 9B, 9C and 9D, as noted above, the rover 110A includes a bladed end effector 810 that includes blades 811, 812 that may be configured to grip opposing sides of the pickface and to transfer the pickface to and from the payload bed 200A. The blades 811, 812 may be connected to a drive section, which may be substantially similar to that described above, for longitudinally moving at least one of the blades 811, 812 in the direction of arrow 999 (FIG. 9) for gripping the sides of the pickface with electrostatic and/or frictional forces (FIGS. 8 and 9A-9D). Each of the blades 811, 812 may be a telescopic blade that includes any suitable number of blade members BM1, BM2 where at least one blade member BM1 is slidably coupled to another blade member BM2 along an axis of extension of the blade for telescopic extension and retraction of each of the blades 811, 812. An electrostatic and/or friction surface 811P, 812P may be fixed to a respective blade member BM1 for engaging the pickface. In other aspects each blade may be a fixed (e.g. non-telescopic blade) or any other suitable end effector member. The blade members BM1, BM2 may be connected to any suitable drive section for driving and extending the blades in the direction of arrow 899 (e.g. along a lateral axis of the rover).

The rover 110A may also include active side justification (where one side blade is fixed and the other is movable or where both blades are movable in a manner substantially similar to that described above) and suitable sensors 950 for physical confirmation of case boundaries (FIG. 9C). The sensors 950 may be beam line or curtain sensors disposed on the side blades of the bot. The sensors 950 may allow the rover to, on placing pickfaces, confirm empty and adequate space exists on any suitable pickface holding location, such as for example a storage shelf 800, 800A, for a pickface and to confirm that the pickface is placed with the correct setback (e.g. the distance the pickface is located from a picking aisle edge of the pickface holding location or any other suitable reference datum). On picking the sensors 950 may allow for case targeting and confirmation of the depth to which the blades are extended into the storage location. The blades 811, 812 may also provide guidance for pickfaces being placed in deep storage locations (e.g. at storage locations that are distant from an edge of, e.g., the storage shelf 800, 800A.

The payload bed 200A of the rover 110A may be configured to allow multi-degree of freedom sliding movement of the pickface 210 (and the case units forming the pickface) along the surface of the payload bed 200A. In one aspect the payload bed may be a substantially flat surface constructed of any suitable material having a low coefficient of friction. In other aspects the payload bed may include a plurality of ball bearings on which the pickface rides. In still other aspects the payload bed 200A may have any suitable construction that allows for the multi-degree of freedom sliding movement of the pickface 210 (and the case units forming the pickface) along the surface of the payload bed 200A.

Figure 9A:
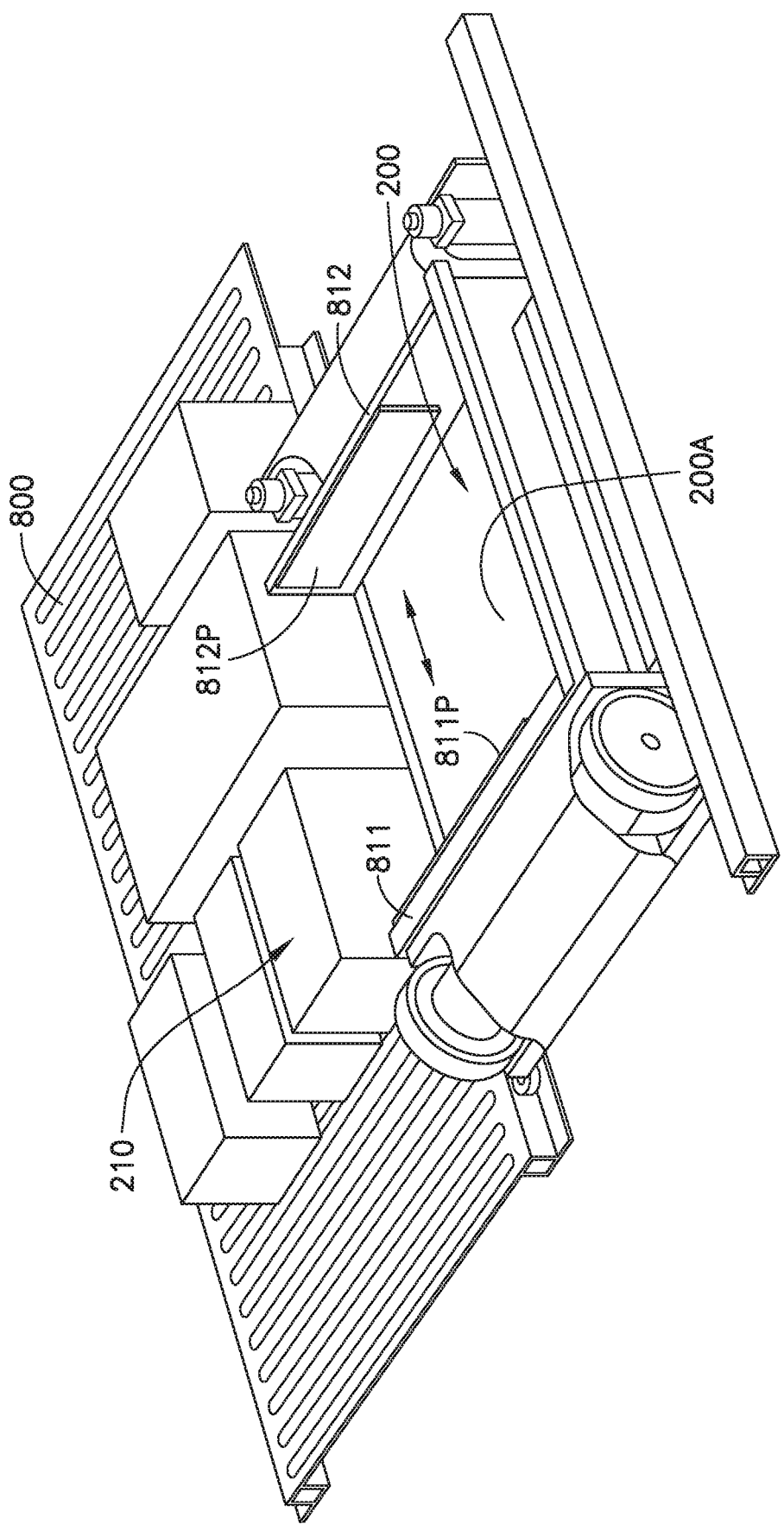
Figure 9B:
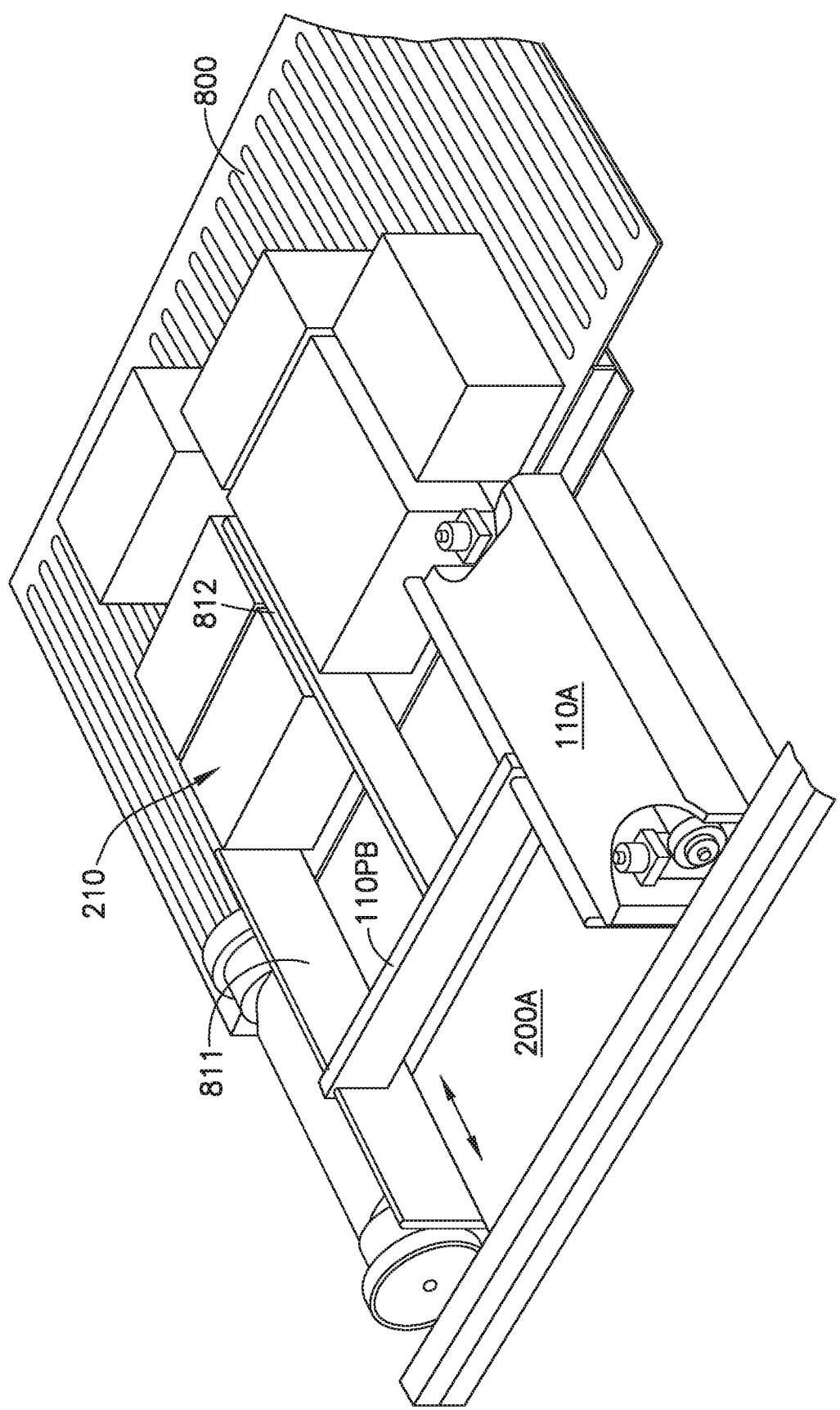
Figure 9D:
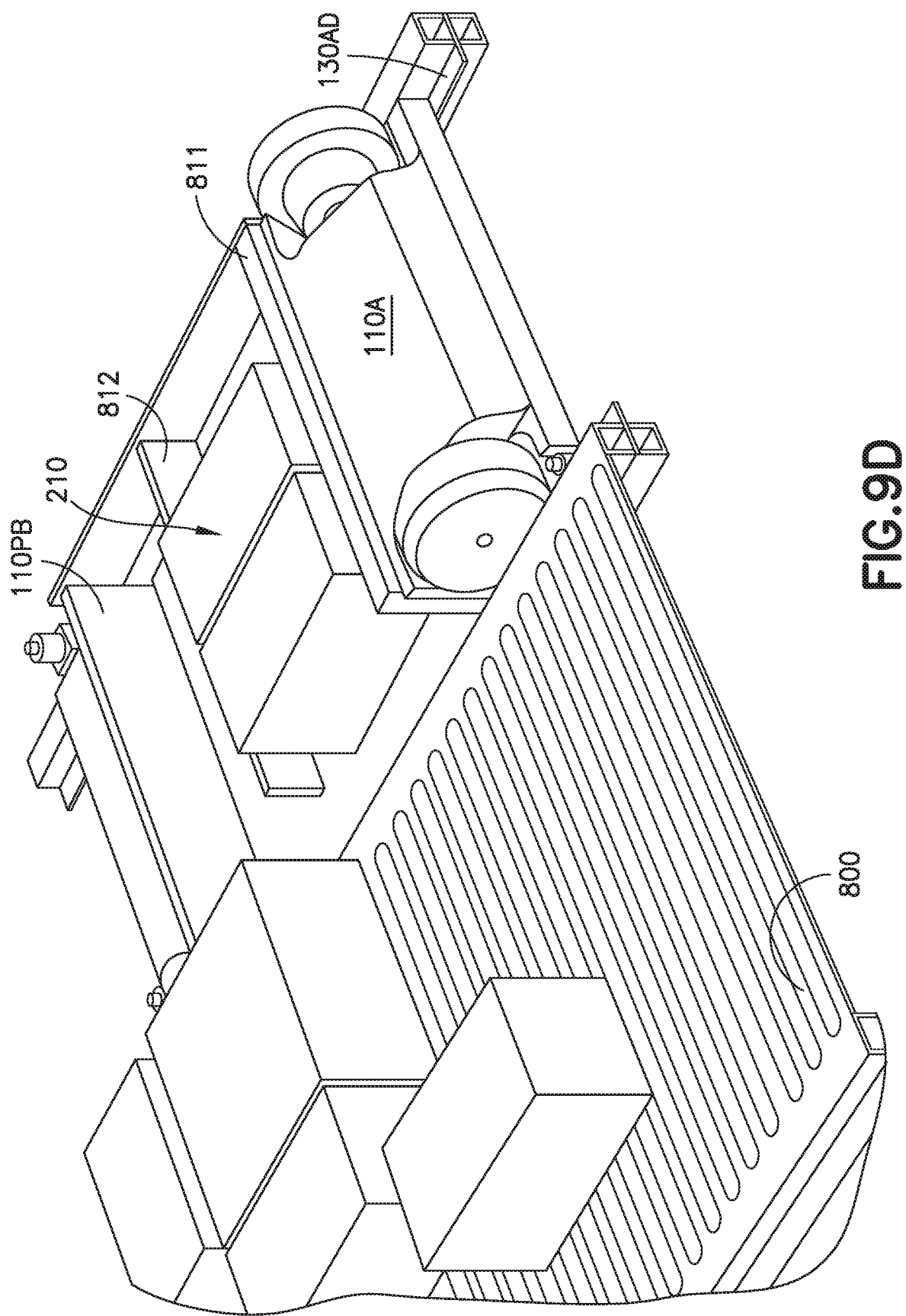
Figure 17:
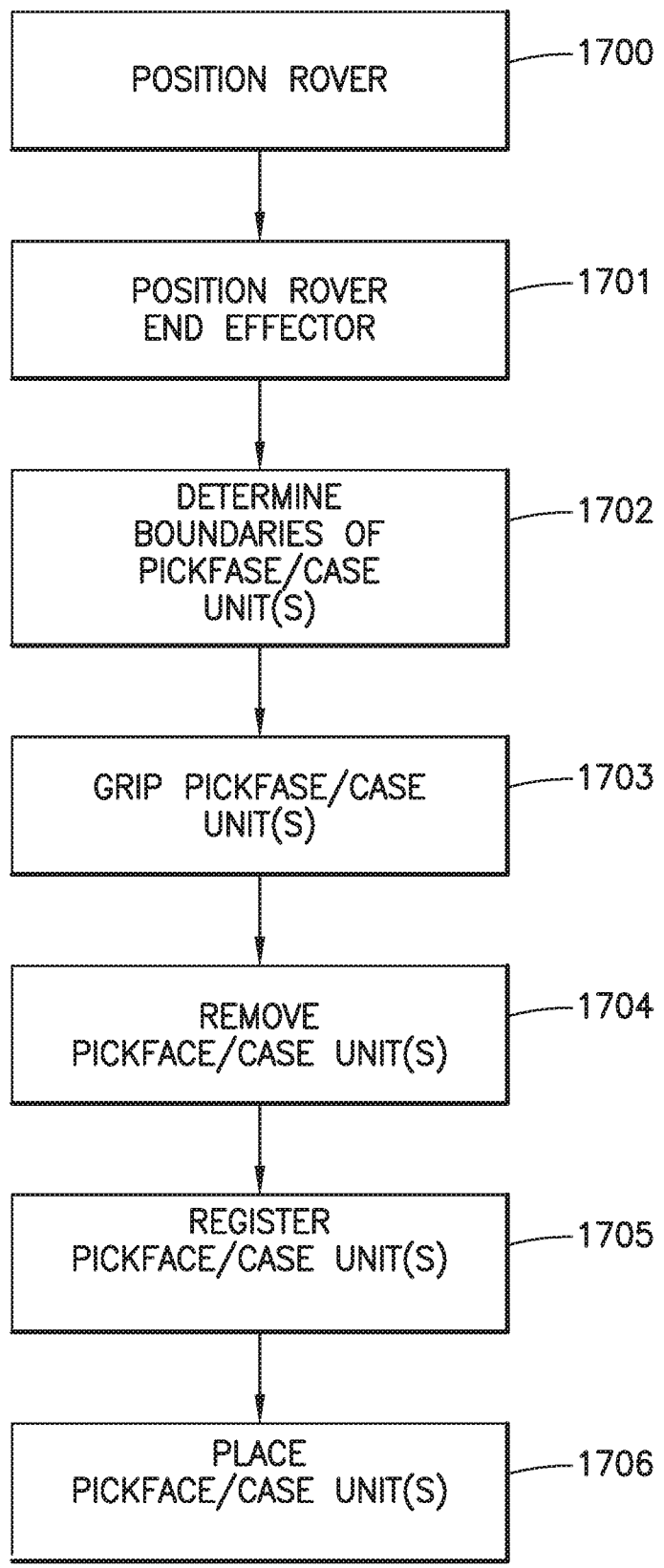
FIG. 17 is a flow diagram in accordance with aspects of the disclosed embodiment.

Referring to FIGS. 9A-9D transfer of a pickface between a pickface holding location, such as for example, storage shelf 800, will be described. The rover 110A enters the picking aisle 130A and stops at a predetermined storage location (FIG. 17, Block 1700). The rover controller 110C may operate the end effector drive section to longitudinally move one or more of the blades 811, 812 to align the blades with the storage location according to, for example, a width of the pickface 210 (FIG. 9A). The rover controller 110C may also operate the drive section to extend the blades 811, 812 into the storage location so that the blades straddle the sides of the pickface 210 (FIG. 9B) (Fi. 17, Block 1701). The sensor 950 may provide feedback to the controller 110C for determining how deep the blades 811, 812 are extended into the storage location and to determine the leading and trailing edge boundaries (with respect to the direction of extension of the blades) of the pickface or a case unit(s) that forms at least part of the pickface (FIG. 9C) (FIG. 17, Block 1702). Once the blades 811, 812 are located in a predetermined position relative to the pickface 210 the blades may move longitudinally to engage or otherwise grip the pickface 210 (or case unit(s) that form at least part of the pickface) in a manner substantially similar to that described above using, for example, force feedback (FIG. 17, Block 1703). For removing the pickface 210 or case unit(s) that form at least part of the pickface (FIG. 17, Block 1704) from the storage location the support surface of the payload bed 200A may be positioned substantially at the same height or lower than the support surface of the storage shelf 800 so that as the blades 811, 812 are retracted the pickface 210 being gripped by the blades 811, 812 can slide off of the storage shelf 800 onto the payload bed 200A (FIG. 9D). Here the blades 811, 812 may not lift the pickface 210 but rather the blades 811, 812 may slide the pickface 210 along the surface of the storage shelf 800 and/or payload bed 200A. In other aspects, the blades 811, 812 may lift the pickface for transfer between the storage location and the payload bed. It is noted that the lowered payload bed 200A may expose a stationary fence 210FE that may be substantially similar to fence 110FE such that if a pickface is being built by the rover 110A the case units forming the pickface can be laterally and longitudinally registered within the payload bay of the rover 110A relative to the frame 110F (FIG. 2) and/or a global reference frame of the automated storage and retrieval system in a manner substantially similar to that described above using the blades 811, 812 for longitudinal registration and the snugging member 110PB and fence 110FE for lateral registration (FIG. 17, Block 1705). During transport of the pickface 210, the pickface may be held by the blades 811, 812 and/or by the snugging member 110PB and fence 110FE. To place the pickface 210 into any suitable pickface holding location the rover 110 may be positioned at a predetermined location relative to the pickface holding location. The payload bed 200A may be raised to a level substantially equal to or above the support surface of the pickface holding location and the blades 811, 812 may slide the pickface 210 off of the payload bed 200A onto the support surface of the pickface holding location (FIG. 17, Block 1706) in a manner substantially similar to that described above for sliding the pickface onto the payload bed 200A. As may be realized, while transfer of payload to and from the rover 110A is described with respect to pickface 210 it should be understood that the above-description also applies to transfer of individual case units to and from the rover 110A. In addition, while reference is made to the storage shelf 800, 800A it should be understood that the rover may transfer a case unit and/or a pickface formed of case units to any suitable pickface holding location such as the storage shelves 800, 800A, a shelf of a lift 150A, 150B or any other suitable location.

Referring now to FIGS. 12-15 a portion of the automated storage and retrieval system is shown in accordance with aspects of the disclosed embodiment. In this aspect, the rover 110A is configured to access stacked storage shelves 800V1A, 800V2A, 800V1B, 800V2B from a single picking aisle deck 130ADV1, 130ADV2 as noted above with respect to FIG. 10B. For exemplary purposes only, in this aspect each picking aisle deck 130ADV1, 130ADV2 provides access to levels of storage but in other aspects each picking aisle ma provide access to more than two levels of storage. It is noted that the level of storage accessed by each picking aisle may vary from one picking aisle deck to another picking aisle deck (e.g. one deck may provide access to a first number of storage levels while another deck may provide access to a second number storage levels where the second number is different than the first number). The rover 110A may include a vertical drive section 13000 (FIG. 13) that may lift or lower the payload bay 200 (e.g. the payload bed 200A, the snugger member 110PB to a predetermined height corresponding to a storage level from or to which a case unit or pickface is to be picked or placed in a manner substantially similar to that described above with respect to FIGS. 9A-9D. The vertical drive section 13000 may be any suitable drive section configured to raise and lower the payload bed 200 such as, for example, a linear actuator, a screw drive, scissor lift, a magnetic drive, etc. In another aspect, where the blades 811, 812 lift the case unit or pickface off of the payload bed 200A for transfer to storage location the vertical drive 13000 may be configured to cause vertical movement of the blades 811, 812 while the payload bed 200A remains vertically fixed.

In accordance with one or more aspects of the disclosed embodiment a method for building a pickface including at least two case units in an automated storage and retrieval system having an array of storage spaces is provided. The method includes providing an autonomous rover configured to transfer case units between the rover and the array of storage spaces; picking, with the rover, a first case unit from a predetermined storage space; and picking, with the rover, at least a second case unit from a different predetermined storage space; wherein the first case unit and the at least second case unit form the pickface and are transported as a unit.

In accordance with one or more aspects of the disclosed embodiment the predetermined storage space and the different predetermined storage space are disposed on shelves that are stacked one above the other.

In accordance with one or more aspects of the disclosed embodiment an autonomous rover is provided. The autonomous rover includes a frame having a first end and a second end longitudinally spaced from the first end and forming a payload bay, the payload bay being sized to support a pickface; a common active registration surface configured to engage the pickface; and a drive section connected to the common active registration surface, the drive section being configured to variably position the common active registration surface relative to at least one storage shelf of an automated storage and retrieval system to effect placement of the pickface on the storage shelf so that pickfaces are substantially continuously arranged along the at least one storage shelf with a predetermined storage spacing between the pickfaces.

In accordance with one or more aspects of the disclosed embodiment the predetermined storage spacing comprises only a sufficient clearance between adjacent pickfaces to allow contactless insertion or removal of the pickfaces to and from an allocated storage space.

In accordance with one or more aspects of the disclosed embodiment the autonomous rover is configured to pick one or more items from one or more storage location of the at least one storage shelf to build a pickface.

In accordance with one or more aspects of the disclosed embodiment the at least one storage shelf comprises stacked storage shelves and the autonomous rover is configured to pick one or more items from one or more storage location of the stacked storage shelves to build a pickface.

In accordance with one or more aspects of the disclosed embodiment an autonomous rover is provided. The autonomous rover includes a frame having a first end and a second end longitudinally spaced from the first end and forming a payload bay, the payload bay being sized to support a pickface; a common active registration surface configured to engage the pickface; and a drive section connected to the common active registration surface, the drive section being configured to variably position the common active registration surface relative to at least the frame.

In accordance with one or more aspects of the disclosed embodiment the variable positioning of the common active registration surface effects placement of the pickface on a storage shelf so that pickfaces are substantially continuously arranged along the shelf with a predetermined storage spacing between the pickfaces.

In accordance with one or more aspects of the disclosed embodiment the autonomous rover is configured to pick one or more items from one or more storage locations of a storage shelf for building a pickface.

In accordance with one or more aspects of the disclosed embodiment the one or more storage location are disposed on storage shelves that are stacked one above the other.

In accordance with one or more aspects of the disclosed embodiment the autonomous rover further includes a controller connected to the drive section to effect movement of the common active registration surface so that an average position of the common active registration surface relative to the payload bay is substantially coincident with a predetermined position of the pickface within the payload bay.

In accordance with one or more aspects of the disclosed embodiment the autonomous rover of further includes a controller connected to the drive section to effect movement of the common active registration surface for engagement with the pickface, the controller being configured to monitor at least a current value of the drive section to control an engagement force of the common active registration surface with the pickface. In another aspect, the controller includes a Kalman filter configured to determine the engagement force.

In accordance with one or more aspects of the disclosed embodiment the common active registration surface includes a first movable member disposed at least partly within the payload bay; and a second movable member disposed at least partly within the payload bay, the second movable member being opposingly positioned relative to the first movable member; wherein the drive section is configured to move the first and second movable members towards and away from each other and together longitudinally as a unit.

In accordance with one or more aspects of the disclosed embodiment the drive section is configured to variably position the common active registration surface relative to a global automated storage and retrieval reference frame.

In accordance with one or more aspects of the disclosed embodiment the variable positioning of the common active registration surface decouples placement of the pickface from the frame.

In accordance with one or more aspects of the disclosed embodiment the pickface includes at least one case unit that is moved together as a unit.

In accordance with one or more aspects of the disclosed embodiment an automated storage and retrieval system is provided. The automated storage and retrieval system includes an array of storage locations; and at least one autonomous rover in communication with the array of storage locations, the at least one autonomous rover including a frame having a first end and a second end longitudinally spaced from the first end and forming a payload bay, the payload bay being sized to support a pickface; a common active registration surface configured to engage the pickface; and a drive section connected to the common active registration surface, the drive section being configured to variably position the common active registration surface relative to at least the frame.

In accordance with one or more aspects of the disclosed embodiment the variable positioning of the common active registration surface effects placement of the pickface on a storage shelf of the array of storage locations so that pickfaces are substantially continuously arranged along the shelf with a predetermined storage spacing between the pickfaces.

In accordance with one or more aspects of the disclosed embodiment the autonomous rover is configured to pick one or more items from one or more storage locations to build a pickface.

In accordance with one or more aspects of the disclosed embodiment the at least one autonomous rover further includes a controller connected to the drive section to effect movement of the common active registration surface so that an average position of the common active registration surface relative to the payload bay is substantially coincident with a predetermined position of the pickface within the payload bay.

In accordance with one or more aspects of the disclosed embodiment the at least one autonomous rover further includes a controller connected to the drive section to effect movement of the common active registration surface for engagement with the pickface, the controller being configured to monitor at least a current value of the drive section to control an engagement force of the common active registration surface with the pickface. In another aspect, the controller includes a Kalman filter configured to determine the engagement force.

In accordance with one or more aspects of the disclosed embodiment the common active registration surface includes a first movable member disposed at least partly within the payload bay; and a second movable member disposed at least partly within the payload bay, the second movable member being opposingly positioned relative to the first movable member; wherein the drive section is configured to move the first and second movable members towards and away from each other and together longitudinally as a unit.

In accordance with one or more aspects of the disclosed embodiment the drive section is configured to variably position the common active registration surface relative to a global automated storage and retrieval reference frame.

In accordance with one or more aspects of the disclosed embodiment the variable positioning of the common active registration surface decouples placement of the pickface from the frame.

In accordance with one or more aspects of the disclosed embodiment the pickface includes at least one case unit that is moved together as a unit.

In accordance with one or more aspects of the disclosed embodiment an autonomous rover is provided. The autonomous rover includes a frame forming a payload bay, the payload bay being sized to support at least one case unit; a first movable member disposed at least partly within the payload bay; a second movable member disposed at least partly within the payload bay, the second movable member being opposingly positioned relative to the first movable member; a drive section connected to the frame and including a respective drive motor for each of first and second movable members, the drive section being configured to move the first and second movable members between a retracted and deployed positions for engaging the at least one case unit; and a controller configured to at least control the drive section for effecting movement of the first and second movable members; wherein the first and second movable members are configured to grip the at least one case unit and the controller effects variably positioning the at least one case unit within the payload bay so that the positioning of the at least one case unit is decoupled from the frame.

In accordance with one or more aspects of the disclosed embodiment the autonomous rover further includes a controller configured to at least control the drive section for effecting movement of the first and second movable members towards and away from each other.

In accordance with one or more aspects of the disclosed embodiment the autonomous rover further includes a controller configured to at least control the drive section for effecting movement of the first and second movable members as a unit along a length of the payload bay.

In accordance with one or more aspects of the disclosed embodiment the autonomous rover further includes an end effector connected to the frame and being configured to transfer the at least one case unit to and from the payload bay; wherein the controller effects variably positioning the at least one case unit relative to the end effector. In other aspects the frame includes a first end; and a second end longitudinally spaced from the first end; wherein the end effector is configured for lateral movement relative to the payload bay and the first and second movable members are arranged to longitudinally traverse a length of the payload bay.

In accordance with one or more aspects of the disclosed embodiment each respective drive motor is mounted to a respective one of the first and second movable members and the drive section includes a common drive member coupled to each of the respective drive motors, the common drive member being movably fixed relative to the frame.

In accordance with one or more aspects of the disclosed embodiment each respective drive motor is mounted to the frame and the drive section includes an independently movable drive member connected to each of the respective motors for coupling a respective one of the first and second movable members to the respective drive motor.

In accordance with one or more aspects of the disclosed embodiment the autonomous rover further includes a linear guide member disposed below the payload surface, where the first and second movable members are movably mounted to and depend from the linear guide member. In another aspect, each of the first and second movable members is cantilevered from the linear guide member.

In accordance with one or more aspects of the disclosed embodiment the drive section comprises a two degree of freedom drive configured to independently drive each of the first and second movable members.

In accordance with one or more aspects of the disclosed embodiment a method for justifying at least one case unit within a payload bay of an autonomous rover is provided where the autonomous rover includes a frame forming the payload bay and an end effector for moving the at least one case unit to and from the payload bay. The method includes providing a first movable member and a second movable member at least partly within the payload bay; independently driving each of the first and second movable members for gripping the at least one case unit; and moving the at least one case unit with the first and second movable members for variably positioning the at least one case unit within the payload bay so that the positioning of the at least one case unit is decoupled from the frame.

In accordance with one or more aspects of the disclosed embodiment the at least one case unit is positioned relative to the end effector.

In accordance with one or more aspects of the disclosed embodiment an autonomous rover for an automated storage and retrieval system is provided. The autonomous rover includes a frame having a first end and a second end longitudinally spaced from the first end, the frame forming a payload bay; a payload bed movably mounted at least partly within the payload bay, the payload bed being movable in a first plane and having a substantially frictionless payload support surface for allowing substantially snagless sliding of a pickface across the payload support surface; and a first gripping member and second gripping member movably mounted to the payload bed and being configured to laterally extend relative to the frame and to grip only opposing sides of the pickface, at least one of the first and second gripping members being longitudinally movable relative to payload bed, where movement of the first and second gripping members is along a second plane substantially orthogonal to the first plane, and the first and second gripping members move as a unit with the payload bed in the first plane.

In accordance with one or more aspects of the disclosed embodiment the first and second gripping members are configured to electrostatically grip the opposing sides of the pickface.

In accordance with one or more aspects of the disclosed embodiment the first and second gripping members are configured to frictionally grip the opposing sides of the pickface.

In accordance with one or more aspects of the disclosed embodiment the autonomous rover further includes at least one sensor configured to at least one of detect at least one boundary of the pickface gripped by the first and second gripping members, confirm empty storage spaces of a predetermined size exist on substantially flat storage shelves accessible to the autonomous rover, confirm the pickface is placed on the substantially flat storage shelves with a predetermined setback, confirm a distance which the first and second gripper members are extended into a storage location of the substantially flat storage shelves, and provide guidance for placement of pickfaces in the storage locations of the substantially flat storage shelves. In another aspect, the at least one sensor is disposed on at least one of the first and second gripping members.

In accordance with one or more aspects of the disclosed embodiment the frame includes a side fence, the payload bed being configured to move relative to the frame to expose the side fence to a pickface disposed on the substantially frictionless payload support surface.

In accordance with one or more aspects of the disclosed embodiment an automated storage and retrieval system includes a storage structure having substantially flat storage shelves and at least one rover support surface disposed between adjacent substantially flat storage shelves, each storage shelf having a substantially snagless pickface support surface configured to allow sliding of a pickface across the snagless pickface support surface; and an autonomous rover having a frame configured to traverse the at least one rover support surface, a payload bed movably mounted to the frame, the payload bed having a substantially frictionless payload support surface configured to allow sliding of a pickface across the substantially frictionless payload support surface, and gripping members movably mounted to the payload bed, the gripping members being configured to grip only opposing sides of a pickface; wherein the gripping members are movable in at least two degrees of freedom relative to the frame for sliding transfer of the pickface between the substantially frictionless payload support surface and the substantially snagless pickface support surface.

In accordance with one or more aspects of the disclosed embodiment the payload bed moves in a first plane and the gripping members move in a second plane that is orthogonal to the first plane.

In accordance with one or more aspects of the disclosed embodiment the gripping members comprise a longitudinally movable gripping member and a stationary gripping member configured to positionally justify a pickface relative to the frame.

In accordance with one or more aspects of the disclosed embodiment the gripping members are configured to electrostatically grip the opposing sides of the pickface.

In accordance with one or more aspects of the disclosed embodiment the gripping members are configured to frictionally grip the opposing sides of the pickface.

In accordance with one or more aspects of the disclosed embodiment the substantially flat storage shelves are configured to allow fluids to pass through the substantially flat storage shelves. In another aspect, the substantially flat storage shelves have pass through stiffening ribs. In yet another aspect, the substantially flat storage shelves comprise wire shelves. In still another aspect, fluid containment trays are positioned below at least one substantially flat storage shelf.

In accordance with one or more aspects of the disclosed embodiment the autonomous rover includes at least one sensor configured to at least one of detect at least one boundary of the pickface gripped by the gripping members, confirm empty storage spaces of a predetermined size exist on the substantially flat storage shelves, confirm the pickface is placed on the substantially flat storage shelves with a predetermined setback, confirm a distance which the gripper members are extended into a storage location of the substantially flat storage shelves, and provide guidance for placement of pickfaces in the storage locations of the substantially flat storage shelves. In one aspect, the at least one sensor is disposed on at least one of the gripping members.

In accordance with one or more aspects of the disclosed embodiment the frame includes a side fence, the payload bed being configured to move relative to the frame to expose the side fence to a pickface disposed on the substantially frictionless payload support surface.

In accordance with one or more aspects of the disclosed embodiment the substantially flat storage shelves comprise a plurality of vertically spaced storage shelves and the at least rover support surface comprises a plurality of vertically spaced rover support surfaces where the payload bed is movable relative to the frame for providing autonomous rover access to at least two of the vertically spaced storage shelves from a single rover support surface.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. An autonomous rover comprising:
a frame having a first end and a second end longitudinally spaced from the first end and forming a payload bay, the payload bay being sized to support a pickface;
at least a first common registration surface and a second common registration surface, each of the at least the first common registration surface and the second common registration surface being
configured to engage the pickface supported on payload supports in the payload bay, and
distinct and decoupled from the payload supports; and
a drive section being:
connected to the at least the first common registration surface and the second common registration surface, and
configured to variably position the at least the first common registration surface and the second common registration surface relative to each other and at least one storage shelf of an automated storage and retrieval system to justify the pickface so as to effect placement of one item from the pickface on the at least one storage shelf in a substantially continuous arrangement along the at least one storage shelf with other shelved items arranged on the at least one storage shelf.

2. The autonomous rover of claim 1, wherein variable positioning of the at least the first common registration surface, the second common registration surface, and a third common registration surface effects placement of the pickface on a storage shelf so that pickfaces are substantially continuously arranged along the shelf with a predetermined storage spacing between the pickfaces.

3. The autonomous rover of claim 1, wherein the autonomous rover is configured to pick one or more items from one or more storage locations of the at least one storage shelf to build the pickface.

4. The autonomous rover of claim 1, wherein each of the other shelved items define pickfaces picked by the autonomous rover.

5. The autonomous rover of claim 1, wherein spacing between at least one item placed on the shelf and adjacent shelved items is decoupled from arrangement of the autonomous rover frame.

6. The autonomous rover of claim 1, wherein spacing between at least one item placed on the shelf and adjacent shelved items is a minimum spacing determined by a seating surface of the at least one storage shelf, independent of autonomous rover frame structure.

7. The autonomous rover of claim 1, further comprising a controller connected to the drive section to effect movement of one of the at least the first common registration surface and the second common registration surface so that an average position of the one of the at least the first common registration surface and the second common registration surface relative to the payload bay is substantially coincident with a predetermined position of the pickface within the payload bay.

8. The autonomous rover of claim 1, further comprising a controller connected to the drive section to effect movement of one of the at least the first common registration surface and the second common registration surface for engagement with the pickface, the controller being configured to monitor at least a current value of the drive section to control an engagement force of the one of the at least the first common registration surface and the second common registration surface with the pickface wherein, the controller includes a Kalman filter configured to determine the engagement force.

9. The autonomous rover of claim 1, wherein:
one of the at least the first common registration surface and the second common registration surface includes
a first movable member disposed at least partly within the payload bay, and
a second movable member disposed at least partly within the payload bay, the second movable member being opposingly positioned relative to the first movable member; and
wherein the drive section is configured to move the first and second movable members towards and away from each other and together longitudinally as a unit.

10. The autonomous rover of claim 1, wherein the drive section is configured to variably position the at least the first common registration surface and the second common registration surface relative to a global automated storage and retrieval system reference frame.

11. The autonomous rover of claim 1, wherein variable positioning of the at least the first common registration surface and the second common registration surface decouples placement of the pickface from the frame.

12. An automated storage and retrieval system comprising:
an array of storage locations arranged on at least one storage shelf; and
at least one autonomous rover in communication with the array of storage locations, the at least one autonomous rover including:
a frame having a first end and a second end longitudinally spaced from the first end and forming a payload bay, the payload bay being sized to support a pickface;
at least a first common registration surface and a second common registration surface, each of the at least the first common registration surface and the second common registration surface being
configured to engage the pickface supported on payload supports in the payload bay, and
distinct and decoupled from the payload supports; and
a drive section being:
connected to the at least the first common registration surface and the second common registration surface and
configured to variably position the at least the first common registration surface and the second common registration surface relative to each other and the at least one storage shelf to justify the pickface so as to effect placement of one item from the pickface on the at least one storage shelf in a substantially continuous arrangement along the at least one storage shelf with other shelved items arranged on the at least one storage shelf.

13. The automated storage and retrieval system of claim 12, wherein variable positioning of the at least the first common registration surface, the second common registration surface, and a third common registration surface effects placement of the pickface on a storage shelf so that pickfaces, are substantially continuously arranged along the shelf with a predetermined storage spacing between the pickfaces.

14. The automated storage and retrieval system of claim 12, wherein the autonomous rover is configured to pick one or more items from one more storage locations of the at least one storage shelf to build the pickface.

15. The automated storage and retrieval system of claim 12, wherein each of the other shelved items define pickfaces picked by the autonomous rover.

16. The automated storage and retrieval system of claim 12, wherein spacing between at least one item placed on the shelf and adjacent shelved items is decoupled from arrangement of the autonomous rover frame.

17. The automated storage and retrieval system of claim 12, wherein spacing between at least one item placed on the shelf and adjacent shelved items is a minimum spacing determined by a seating surface of the at least one storage shelf, independent of the autonomous rover frame structure.

18. The automated storage and retrieval system of claim 12, further comprising a controller connected to the drive section to effect movement of one of the at least the first common registration surface and the second common registration surface so that an average position of the one of the at least the first common registration surface and the second common registration surface relative to the payload bay is substantially coincident with a predetermined position of the pickface within the payload bay.

19. The automated storage and retrieval system of claim 12, further comprising a controller connected to the drive section to effect movement of one of the at least the first common registration surface and the second common registration surface for engagement with the pickface, the controller being configured to monitor at least a current value of the drive section to control an engagement force of the one of the at least the first common registration surface and the second common registration surface with the pickface wherein, the controller includes a Kalman filter configured to determine the engagement force.

20. The automated storage and retrieval system of claim 12, wherein:
one of the at least the first common registration surface and the second common registration surface includes
a first movable member disposed at least partly within the payload bay, and
a second movable member disposed at least partly within the payload bay, the second movable member being opposingly positioned relative to the first movable member; and
wherein the drive section is configured to move the first and second movable members towards and away from each other and together longitudinally as a unit.

21. The automated storage and retrieval system of claim 12, wherein the drive section is configured to variably position the at least the first common registration surface and the second common registration surface relative to a global automated storage and retrieval system reference frame.

22. The automated storage and retrieval system of claim 12, wherein variable positioning of the at least the first common registration surface and the second common registration surface decouples placement of the pickface from the frame.

23. A method for building a pickface comprising:
providing a frame of an autonomous rover having a first end and a second end longitudinally spaced from the first end and forming a payload bay, the payload bay being sized to support the pickface;
providing at least a first common registration surface and a second common registration surface, each of the at least the first common registration surface and the second common registration surface being configured to engage the pickface supported on payload supports in the payload bay, and the distinct and decoupled from payload supports;
providing a drive section being connected to the at least the first common registration surface and the second common registration surface;
variably positioning, with the drive section, the at least the first common registration surface and the second common registration surface relative to each other and at least one storage shelf of an automated storage and retrieval system to justify the pickface; and
effecting placement of one item from the pickface on the at least one storage shelf in a substantially continuous arrangement along the at least one storage shelf with other shelved items arranged on the at least one storage shelf.

24. The method of claim 23, further comprising variably positioning the at least the first common registration surface, the second common registration surface, and a third common registration surface, effecting placement of the pickface on a storage shelf so that pickfaces are substantially continuously arranged along the shelf with a predetermined storage spacing between the pickfaces.

25. The method of claim 23, wherein the autonomous rover is configured to pick one or more items from one or more storage locations of the at least one storage shelf to build the pickface.

26. The method of claim 23, wherein each of the other shelved items define pickfaces picked by the autonomous rover.

27. The method of claim 23, wherein spacing between at least one item placed on the shelf and adjacent shelved items is decoupled from arrangement of the autonomous rover frame.

28. The method of claim 23, wherein spacing between the least one item placed on the shelf and adjacent shelved items is a minimum spacing determined by a seating surface of the at least one storage shelf, independent of the autonomous rover frame structure.

* * * * *